United States Patent
Kawasaki et al.

(10) Patent No.: US 9,780,411 B2
(45) Date of Patent: Oct. 3, 2017

(54) NONAQUEOUS ELECTROLYTE SOLUTION SECONDARY BATTERY

(71) Applicant: NEC Corporation, Tokyo (JP)

(72) Inventors: Daisuke Kawasaki, Tokyo (JP); Ikiko Shimanuki, Tokyo (JP); Noboru Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/771,749

(22) PCT Filed: Feb. 28, 2014

(86) PCT No.: PCT/JP2014/055172
§ 371 (c)(1),
(2) Date: Aug. 31, 2015

(87) PCT Pub. No.: WO2014/133163
PCT Pub. Date: Sep. 4, 2014

(65) Prior Publication Data
US 2016/0028123 A1    Jan. 28, 2016

(30) Foreign Application Priority Data
Mar. 1, 2013  (JP) .................................. 2013-041321

(51) Int. Cl.
| | |
|---|---|
| *H01M 4/36* | (2006.01) |
| *H01M 10/0567* | (2010.01) |
| *H01M 10/0569* | (2010.01) |
| *H01M 4/505* | (2010.01) |
| *H01M 4/525* | (2010.01) |
| *H01M 10/052* | (2010.01) |
| *H01M 10/0525* | (2010.01) |

(52) U.S. Cl.
CPC ....... *H01M 10/0569* (2013.01); *H01M 4/364* (2013.01); *H01M 4/505* (2013.01); *H01M 4/525* (2013.01); *H01M 10/052* (2013.01); *H01M 10/0525* (2013.01); *H01M 10/0567* (2013.01); *H01M 2300/0034* (2013.01); *Y02T 10/7011* (2013.01)

(58) Field of Classification Search
CPC ......... H01M 10/0525; H01M 10/0568; H01M 10/0569; H01M 4/364; H01M 4/505; H01M 4/525
See application file for complete search history.

(56) References Cited

U.S. PATENT DOCUMENTS

| | | | |
|---|---|---|---|
| 2004/0043300 A1* | 3/2004 | Utsugi | H01M 10/0567 429/329 |
| 2007/0111105 A1 | 5/2007 | Zaghib et al. | |
| 2007/0148546 A1* | 6/2007 | Shimizu | H01M 4/131 429/231.1 |
| 2007/0154815 A1* | 7/2007 | Kawasaki | H01M 4/131 429/340 |
| 2007/0218365 A1 | 9/2007 | Takezawa et al. | |
| 2008/0268347 A1 | 10/2008 | Ohzuku et al. | |
| 2009/0123832 A1 | 5/2009 | Chigiri | |
| 2009/0325074 A1 | 12/2009 | Fukumoto et al. | |
| 2010/0297501 A1 | 11/2010 | Seki et al. | |
| 2011/0248719 A1 | 10/2011 | Aoki | |
| 2012/0255858 A1 | 10/2012 | Maeshima et al. | |
| 2013/0011747 A1 | 1/2013 | Sasaki et al. | |
| 2013/0029218 A1 | 1/2013 | Waki et al. | |
| 2013/0059205 A1 | 3/2013 | Yamamura et al. | |
| 2015/0349332 A1 | 12/2015 | Azami et al. | |
| 2016/0020492 A1 | 1/2016 | Azami et al. | |

FOREIGN PATENT DOCUMENTS

| | | |
|---|---|---|
| CN | 102214826 A | 10/2011 |
| EP | 2535974 A1 | 12/2012 |

(Continued)

OTHER PUBLICATIONS

Machine translation of JP 2008-084743, published in Apr. 10, 2008.*

(Continued)

*Primary Examiner* — Anca Eoff
(74) *Attorney, Agent, or Firm* — Wilmer Cutler Pickering Hale and Dorr LLP

(57) ABSTRACT

A nonaqueous electrolyte solution secondary battery having an electrode element having a positive electrode and a negative electrode disposed so as to face each other, a nonaqueous electrolyte solution, and an outer package housing the electrode element and the nonaqueous electrolyte solution, wherein the nonaqueous electrolyte solution contains a cyclic sulfonic acid ester represented by the general formula (1), and a positive electrode active material in the positive electrode is a mixture of a lithium manganese composite oxide having a spinel structure and a lithium transition metal composite compound having a layered rock salt structure.

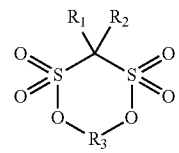

(1)

wherein, in the formula (1), $R_1$ and $R_2$ are each independently a hydrogen atom, an alkyl group having 1 to 5 carbon atoms, a halogen group or an amino group with the proviso that $R_1$ and $R_2$ are not hydrogen atoms at the same time; $R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group.

4 Claims, 1 Drawing Sheet

(56) References Cited

FOREIGN PATENT DOCUMENTS

| | | | |
|---|---|---|---|
| JP | 2000-077097 | A | 3/2000 |
| JP | 2004-185931 | A | 7/2004 |
| JP | 2004-281325 | A | 10/2004 |
| JP | 2004-281368 | A | 10/2004 |
| JP | 2005-222846 | A | 8/2005 |
| JP | 2006-156314 | A | 6/2006 |
| JP | 2006-278106 | A | 10/2006 |
| JP | 2008-084743 | * | 4/2008 |
| JP | 2008-153118 | A | 7/2008 |
| JP | 2009-129747 | A | 6/2009 |
| JP | 2010-062113 | A | 3/2010 |
| WO | WO-2011/096572 | A1 | 8/2011 |
| WO | WO-2011/115247 | A1 | 9/2011 |
| WO | WO-2011/118026 | A1 | 9/2011 |

OTHER PUBLICATIONS

Office Action issued by the U.S. Patent and Trademark Office for U.S. Appl. No. 14/771,763 dated Jul. 7, 2016 (49 pages).
Office Action issued by the U.S. Patent and Trademark Office for U.S. Appl. No. 14/771,898 dated Jul. 8, 2016 (26 pages).
Final Office Action issued by the U.S. Patent and Trademark Office for U.S. Appl. No. 14/771,763 dated Nov. 21, 2016 (20 pages).
International Search Report corresponding to PCT/JP2014/055172 mailed Apr. 8, 2014 (one page).
U.S. Office Action issued in corresponding U.S. Appl. No. 14/771,898, dated Nov. 23, 2016, 21 pages.
Japanese Office Action issued by the Japan Patent Office for Japanese Application No. 2015-503069 dated Aug. 8, 2017 (6 pages).

* cited by examiner

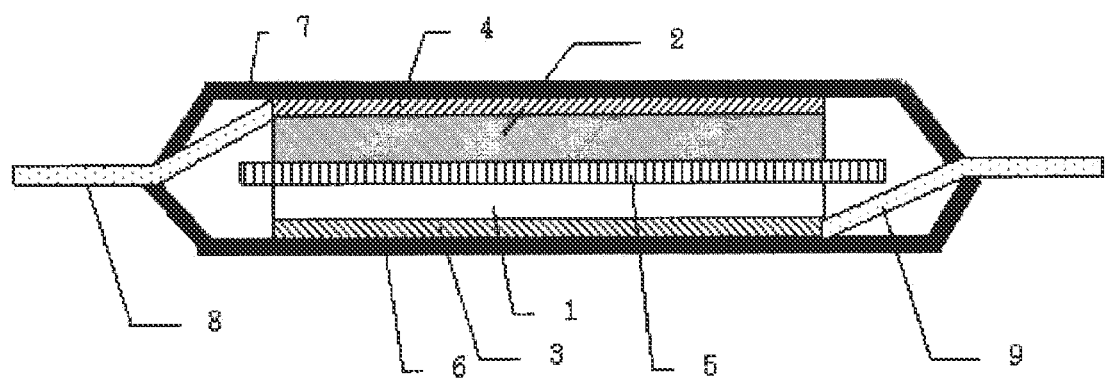

NONAQUEOUS ELECTROLYTE SOLUTION SECONDARY BATTERY

CROSS-REFERENCE TO RELATED APPLICATIONS

This application is a national stage application of International Application No. PCT/JP2014/055172 entitled "Nonaqueous Electrolyte Solution Secondary Battery" filed on Feb. 28, 2014, which claims priority to Japanese Application No. 2013-041321 filed on Mar. 1, 2013, the disclosures of which are hereby incorporated by reference in their entirety.

TECHNICAL FIELD

The present invention relates to an electrolyte solution for a secondary battery containing an additive, and a secondary battery using the same, and further to a lithium ion secondary battery.

BACKGROUND ART

Along with rapid market expansion of laptop computers, cell phones, electric cars, stationary power storage systems and the like, inexpensive, safe, long-life and high-energy density secondary batteries have been demanded. As candidate secondary batteries, lithium ion secondary batteries, which have a high energy density and no memory effect, are supposed to be one of prospective secondary batteries. Particularly in recent years, attention has been paid to the so-called self-discharge property in which the charge capacity does not reduce even when the batteries stand by as being in the charged state.

Means of providing inexpensive, safe, long-life and high-energy density secondary batteries include a method of using an inexpensive and safe lithium manganese composite oxide-based positive electrode, a method of using an inexpensive carbon-based negative electrode, and a method of using a nonaqueous electrolyte solution excellent in stability. Particularly technologies of using a nonaqueous electrolyte solution excellent in stability are important. The reason thereof will be described hereinafter.

In the charge and discharge process of a lithium ion secondary battery, the desorption and absorption reactions of lithium ions occur at the interface between an electrode and an electrolyte solution. At this time, other than these reactions, decomposition reactions of an electrolyte solution solvent and a supporting electrolyte salt may take place in some cases. The decomposition reaction forms a high-resistance film on the electrode surface, and inhibits the desorption and absorption reactions of lithium ions, which should occur primarily. It is known that as a result, the irreversible reduction of the discharge capacity, and the like are promoted and characteristics as a secondary battery degrade.

In order to suppress such degradation, various contrivances have been made. As one of them, a method of forming a protection film on the electrode surface to thereby suppress the above decomposition reaction is exemplified; and means therefor is proposed in which an electrolyte solution additive having a film forming ability is added to an electrolyte solution.

Based on the above, there are disclosed technologies of suppressing the degradation of secondary battery characteristics, particularly some technologies of improving the cycle characteristics and suppressing the internal resistance of a secondary battery in storage.

Patent Literature 1 discloses, as a method of improving the cycle characteristics in the case of using a lithium manganese composite oxide for a positive electrode, a technology in which an electrolyte solution contains a composition capable of reacting with water and generating hydrogen ions, and a hydrogen ion scavenger is disposed at a place in a battery of contacting with the electrolyte solution.

Patent Literature 2, Patent Literature 3 and Patent Literature 4 disclose, as methods of forming a protection film on the electrode surface to thereby suppress the decomposition reaction of an electrolyte solution, a technology in which a secondary battery electrolyte solution containing a cyclic sulfonic acid ester having at least two sulfonyl groups is used, and a technology in which a cyclic or chain disulfonic acid ester having an unsaturated bond is used.

Patent Literature 5 and Patent Literature 6 disclose a technology in which a lithium nickel composite oxide and chain and cyclic disulfonic acid compounds are contained. Patent Literature 7 describes a lithium ion secondary battery having an electrolyte solution containing a cyclic sulfonic acid ester.

Additionally, there have been made various proposals on other electrode materials, shapes, production conditions, and materials such as additives.

CITATION LIST

Patent Literature

Patent Literature 1: Japanese Patent Laid-Open No. 2000-77097
Patent Literature 2: Japanese Patent Laid-Open No. 2004-281368
Patent Literature 3: Japanese Patent Laid-Open No. 2005-222846
Patent Literature 4: Japanese Patent Laid-Open No. 2004-281325
Patent Literature 5: Japanese Patent Laid-Open No. 2006-156314
Patent Literature 6: Japanese Patent Laid-Open No. 2009-129747
Patent Literature 7: Japanese Patent Laid-Open No. 2010-062113

SUMMARY OF INVENTION

Technical Problem

However, even if the technology described in Patent Literature 1 is used, a problem occurs in a long term reliability. The electrolyte solutions containing unsubstituted disulfonic acid esters described in Patent Literature 2, Patent Literature 3 and Patent Literature 4, when being stored, undergo the degradations including the coloration of the electrolyte solutions, the generation of sediments in the electrolyte solutions and the increase of the concentration of free acids. Then, in the case of using such electrolyte solutions, there arise a problem of the influence on battery characteristics such as storage characteristics, particularly of the reduction of the residual capacity associated with the self-discharge. In the case of using the unsubstituted disulfonic acid esters, sediments are generated and thereby liquid injection nozzles are clogged in manufacture of the batteries, causing a problem that the production yield is low.

Patent Literature 5 and Patent Literature 6 are insufficient in studies on lithium ion secondary batteries using specific electrolyte solutions in the case of using specific positive electrode materials.

Therefore, an object of the present invention is to provide a secondary battery which is improved in various battery characteristics and is excellent in storage characteristics, particularly is suppressed in the capacity reduction due to the self-discharge.

Solution to Problem

An embodiment according to the present invention is a nonaqueous electrolyte solution secondary battery having an electrode element having a positive electrode and a negative electrode disposed so as to face each other, a nonaqueous electrolyte solution, and an outer package housing the electrode element and the nonaqueous electrolyte solution, wherein the nonaqueous electrolyte solution contains a cyclic sulfonic acid ester represented by the general formula (1), and a positive electrode active material in the positive electrode is a mixture of a lithium manganese composite oxide having a spinel structure and a lithium transition metal composite compound having a layered rock salt structure.

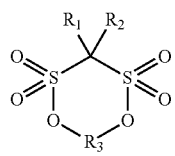
(1)

wherein, in the general formula (1), $R_1$ and $R_2$ are each independently a hydrogen atom, an alkyl group having 1 to 5 carbon atoms, a halogen group or an amino group, with the proviso that $R_1$ and $R_2$ are not hydrogen atoms at the same time; $R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group.

It is especially preferable that $R_1$ in the above general formula (1) denotes a hydrogen atom. Further it is preferable that $R_1$ is a hydrogen atom, and $R_3$ denotes $-(CH_2)_n-$ or $-(CF_2)_n-$ (n=1 to 5) in the above general formula (1). Further it is preferable that $R_1$ is a hydrogen atom, $R_2$ denotes $C_mH_{2m+1}$ (m=1 to 3), and $R_3$ denotes $-CH_2-$ in the above general formula (1).

Further it is preferable that the mixing ratio in weight ratio of the positive electrode active material defined as (a lithium manganese composite oxide)/(the lithium manganese composite oxide+a lithium transition metal composite compound) is 15% by weight to 85% by weight.

Further it is preferable that the lithium manganese composite oxide having a spinel structure is represented by the general formula (2).

$$Li(Mn_{1-\alpha}A_\alpha)_2O_4 \qquad (2)$$

In the general formula (2), A is one or two or more elements selected from the group consisting of Li, Mg, Al, Co and B; and α is $0<\alpha\leq 0.1$.

Further it is preferable that the lithium transition metal composite compound having a layered rock salt structure is represented by the general formula (3).

$$Li_\beta MeO_2 \qquad (3)$$

In the general formula (3), Me necessarily contains Ni, and contains one or two or more elements selected from the group consisting of Co, Al, Mn, Mg and Zr; and β is $0.98\leq\beta\leq 1.02$.

Advantageous Effects of Invention

The embodiment according to the present invention can provide a nonaqueous electrolyte solution secondary battery improved in various battery characteristics and being excellent in storage characteristics, particularly being suppressed in the capacity reduction along with the self-discharge.

BRIEF DESCRIPTION OF DRAWING the FIGURE is a schematic structural view of a laminate outer package-type structure of the nonaqueous electrolyte solution secondary battery of the present invention.

DESCRIPTION OF EMBODIMENT

<A Structure and a Production Method of a Secondary Battery>

As one example of a production method of a secondary battery, a production method of a secondary battery of the FIGURE will be described. In a dry air or inert gas atmosphere, a negative electrode and a positive electrode are laminated through the intermediary of the porous separator 5, and the thus obtained laminate, or the one obtained by winding the laminate is housed in a battery can or an outer package formed of, for example, a flexible film made of a laminate composed of a synthetic resin and a metal foil, and impregnated with a nonaqueous electrolyte solution. Then, before or after the outer package is sealed, the nonaqueous electrolyte solution secondary battery is charged, so that an excellent film can be formed on the negative electrode. As the porous separator 5, porous films of polyolefins such as polypropylene and polyethylene, fluororesins and the like are used. As the outer package, any outer package can be appropriately selected as long as it is stable against the electrolyte solution and has a sufficient water vapor barrier property. For example, in the case of a layered laminate type secondary battery, a laminate film such as polypropylene and polyethylene coated with aluminum or silica can be used as the outer package. In particular, it is preferable to use an aluminum laminate film from the viewpoint of suppressing the volume expansion.

The constitution of the nonaqueous electrolyte solution secondary battery of the present invention is described with reference to the drawing. the FIGURE is an example of the schematic constitutional diagram of the nonaqueous electrolyte solution secondary battery of the present invention. A positive electrode is formed by forming the layer 1 including a positive electrode active material as a film on the positive electrode current collector 3. A negative electrode is formed by forming the layer 2 including a negative electrode active material as a film on the negative electrode current collector 4. These positive electrode and negative electrode are disposed so as to face each other through the intermediary of the porous separator 5. The porous separator 5 is disposed so as to be parallel to the layer 2 including the negative electrode active material. In the secondary battery of the present invention, an electrode element having these positive electrode and negative electrode disposed so as to face each other and the nonaqueous electrolyte solution are housed in the outer packages 6 and 7. Examples of the shape of the secondary battery of the present embodiment include, without being particularly limited to: a laminate outer package type, a cylinder type, a square type and a coin type.

<A Nonaqueous Electrolyte Solution>

A lithium ion secondary battery electrolyte solution (hereinafter, referred to as a "nonaqueous electrolyte solution" or sometimes simply as an "electrolyte solution") in the present embodiment contains a cyclic sulfonic acid ester represented by the general formula (1) (hereinafter, sometimes simply referred to as a "compound of the general formula (1)") as an additive.

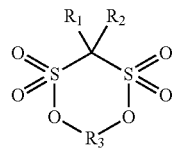

(1)

wherein, in the general formula (1), $R_1$ and $R_2$ are each independently a hydrogen atom, an alkyl group having 1 to 5 carbon atoms, a halogen group or an amino group with the proviso that $R_1$ and $R_2$ are not hydrogen atoms at the same time; $R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group.

The cyclic sulfonic acid ester of the above general formula (1) contained in the nonaqueous electrolyte solution is decomposed by the electrochemical redox reaction during charge-discharge reaction, and forms a film on the surface of the electrode active material, and accordingly can suppress the decomposition of the electrolyte solution and the supporting electrolyte salt. It is considered to be effective in prolonging the life time of the lithium ion secondary battery. The present inventors made a diligent study in more detail on the lithium ion secondary battery comprising a nonaqueous electrolyte solution including the disulfonic acid ester, and have found that the electrolyte solution containing a compound of the general formula (1) has improved storage stability where the degradation is suppressed. It has been also found that the use of the electrolyte solution remarkably improves the capacity maintenance, the storage characteristics and the self-discharge property of the lithium ion secondary battery.

The present inventors presume that the reason thereof is that when a specific position of the disulfonic acid ester has a substituent, specifically when at least one of $R_1$ and $R_2$ in the above general formula (1) is not a hydrogen atom, the reactivity of a decomposition product of the supporting electrolyte salt with the cyclic sulfonic acid ester decreases and the generation of free acids from the electrolyte solution can be suppressed. As shown in Examples described later, as compared with a sulfonic acid ester in which both of $R_1$ and $R_2$ are hydrogen atoms, the stability of the electrolyte solution was improved and the high-temperature storage characteristics of the battery were improved.

The compound of the formula (1) is preferably a compound in which at least one of $R_1$ and $R_2$ is an alkyl group.

The compound is especially preferably a compound in which one thereof is an alkyl group and the other thereof is a hydrogen atom, or both thereof are alkyl groups. Among these, the compound in which one thereof is an alkyl group and the other thereof is a hydrogen atom is most preferable.

The reason why the compound in which one of $R_1$ and $R_2$ is an alkyl group and the other thereof is a hydrogen atom is most preferable will be described hereinafter. It is presumable that when at least one of $R_1$ and $R_2$ is not a hydrogen atom (that is, at least one is a substituent), the reactivity of a decomposition product of the supporting electrolyte salt with the cyclic sulfonic acid ester decreases and the generation of free acids from the electrolyte solution can be suppressed. In the case where at least one of $R_1$ and $R_2$ is not a hydrogen atom (that is, both of $R_1$ and $R_2$ are substituents), however, it is considered that as compared with the case where one is an alkyl group and the other is a hydrogen atom, the film forming ability of forming a film on the surface of the electrode active material decreases and the effect of prolonging the life time of the lithium ion secondary battery decreases.

Examples of the alkyl groups of $R_1$ and $R_2$ include methyl, ethyl, propyl, butyl and pentyl. These may be either linear or branched. In particular, methyl, ethyl and propyl are preferable, and methyl and ethyl are more preferable. Examples of the halogens of $R_1$ and $R_2$ include fluorine, chlorine, bromine and iodine, and fluorine is preferable among these.

$R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group. When the linkage group represented by $R_3$ is asymmetric, the orientation thereof is not limited.

In $R_3$ of formula (1), the alkylene group and the fluoroalkylene group may be either linear or branched, and are preferably linear. In the case of a linear alkylene group, the alkylene group is represented by —$(CH_2)_n$— (n is an integer of 1 to 5), is more preferably a methylene group or an ethylene group represented by —$(CH_2)_n$— (n is 1 or 2), and is furthermore preferably a methylene group represented by —$CH_2$—. In the branched alkylene group, at least one hydrogen atom of the alkylene group represented by —$(CH_2)_n$— (n is an integer of 1 to 4) is substituted with an alkyl group; examples of the branched alkylene group include —$C(CH_3)_2$—, —$C(CH_3)(CH_2CH_3)$—, —$C(CH_2CH_3)_2$—, —$CH(C_mH_{2m+1})$— (m is an integer of 1 to 4), —$CH_2$—$C(CH_3)_2$—, —$CH_2$—$CH(CH_3)$—, —$CH(CH_3)$—$CH(CH_3)$—, —$CH(CH_3)CH_2CH_2$— and —$CH(CH_3)CH_2CH_2CH_2$—; the branched alkylene group is preferably —$C(CH_3)_2$— or —$CH(CH_3)$—, and is more preferably —$CH(CH_3)$—. The fluoroalkylene group means a group in which at least one of the hydrogen atoms in each of the foregoing alkylene groups is substituted with a fluorine; all the hydrogen atoms may be substituted with fluorine atoms, and the position and the number of the fluorine substitution are arbitrary. The fluoroalkylene group may either be linear or branched, and preferably linear. When all the hydrogen atoms are substituted with fluorine atoms in the linear fluoroalkylene group, $R_3$ is represented by —$(CF_2)_n$— (n is an integer of 1 to 5). Specifically, preferable examples of the fluoroalkylene group include monofluoromethylene group, difluoromethylene group, monofluoroethylene group, difluoroethylene group, trifluoroethylene group and tetrafluoroethylene group.

Examples of "the divalent group having 2 to 6 carbon atoms in which alkylene units or fluoroalkylene units are bonded through an ether group" in $R_3$ of formula (1) include: —$R_4$—O—$R_5$— ($R_4$ and $R_5$ each independently represent an alkylene group or a fluoroalkylene group, and the total number of carbon atoms of $R_4$ and $R_5$ is 2 to 6), and —$R_6$—O—$R_7$—O—$R_8$— ($R_6$, $R_7$ and $R_8$ each independently represent an alkylene group or a fluoroalkylene group, and the total number of carbon atoms of $R_6$, $R_7$ and $R_8$ is 3 to 6). $R_4$ and $R_5$ may both be alkylene groups or fluoroalkylene groups, or one of $R_4$ and $R_5$ may be an alkylene group and the other may be a fluoroalkylene group. $R_6$, $R_7$ and $R_8$ may each independently be an alkylene group or a fluoroalkylene group. Examples thereof include: —$CH_2$—O—$CH_2$—, —$CH_2$—O—$C_2H_4$—, —$C_2H_4$—O—$C_2H_4$—, —$CH_2$—O—$CH_2$—O—$CH_2$—, —$CH_2$—O—CHF—, —$CH_2$—O—$CF_2$—, —$CF_2$—O—$CF_2$—, —$C_2F_4$—O—$C_2F_4$—, —$CF_2$—O—$CF_2$—O—$CF_2$— and —$CH_2$—O—$CF_2$—O—$CH_2$—.

Among these, $R_3$ is preferably an alkylene group, a carbonyl group or a fluoroalkylene group, is more preferably an alkylene group or a fluoroalkylene group, and is furthermore preferably —$(CH_2)_n$— (n is 1 or 2), —$C(CH_3)_2$—, —$CH(CH_3)$—, a monofluoromethylene group, a difluoromethylene group, a monofluoroethylene group, a difluoroethylene group, trifluoroethylene group or a tetrafluoroethylene group.

Among these, $R_3$ is preferably —$CH_2$—, —$C(CH_3)_2$—, —$CH(CH_3)$—, —CHF— or —$CF_2$—, and more preferably —$CH_2$— or —$CF_2$—. The reasons for this are not clear; however, it is inferred that this is because when the compound represented by formula (1) is a compound having a six-membered ring structure, such a compound is high in the electrochemical reactivity for forming a film as compared with a compound having a seven-membered ring structure, and accordingly a film having a lower resistance, tougher and of a higher quality is formed. $R_3$ is particularly preferably a methylene group represented by —$CH_2$—.

Among the compounds represented by formula (1), the compounds represented by the following formula (1-1) are preferable, and the compounds represented by the following formula (1-2) or the following formula (1-3) are more preferable.

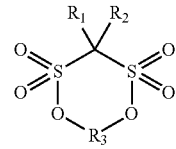

(1-1)

wherein, in formula (1-1), $R_1$ and $R_2$ each independently represent a hydrogen atom, an alkyl group having 1 to 5 carbon atoms, a halogen atom or an amino group with the proviso that $R_1$ and $R_2$ are not hydrogen atoms at the same time; and $R_3$ is a methylene group which may be substituted with fluorine.

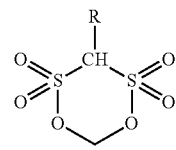

(1-2)

wherein, in the general formula (1-2), R represents methyl, ethyl, propyl, butyl or pentyl, and preferably represents methyl or ethyl.

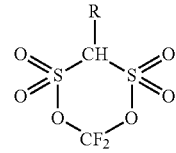

(1-3)

wherein, in the general formula (1-3), R represents methy ethyl, propyl, butyl or pentyl, and preferably represents methyl or ethyl.

Table 1 specifically shows typical examples of the compounds represented by the general formula (1), but the present invention is not limited to these.

TABLE 1

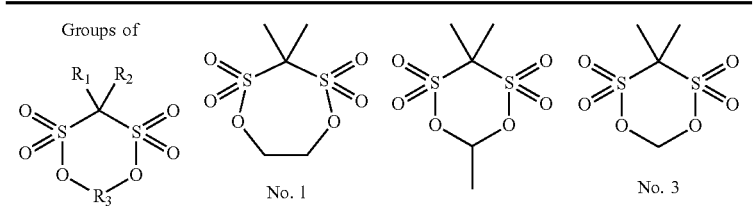

Groups of

No. 1   No. 2   No. 3

R1 = H

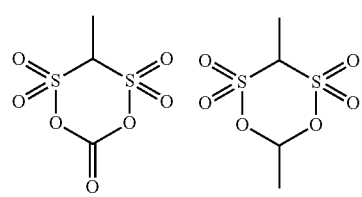

No. 4   No. 5

TABLE 1-continued

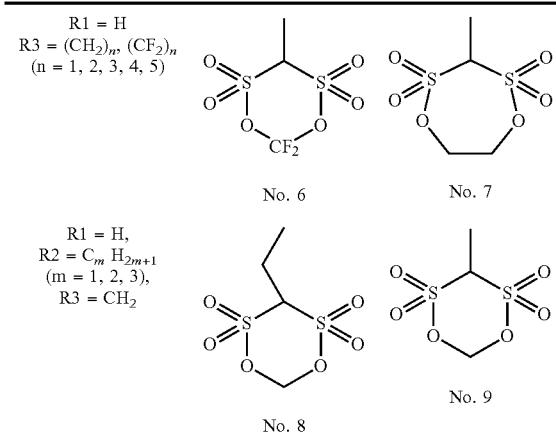

R1 = H
R3 = (CH$_2$)$_n$, (CF$_2$)$_n$
(n = 1, 2, 3, 4, 5)

No. 6    No. 7

R1 = H,
R2 = C$_m$H$_{2m+1}$
(m = 1, 2, 3),
R3 = CH$_2$

No. 8    No. 9

Examples of the preferable compounds of the formula (1) include the compounds in which in formula (1), R$_1$ is a methyl group or an ethyl group, R$_2$ is a hydrogen atom, R$_3$ is a methylene group or an ethylene group. Among these, the compounds in which in formula (1), R$_1$ is a methyl group or an ethyl group, R$_2$ is a hydrogen atom and R$_3$ is a methylene group are preferable, and the compound in which in formula (1), R$_1$ is a methyl group, R$_2$ is a hydrogen atom and R$_3$ is a methylene group is more preferable.

The compounds of the formula (1) may be used each alone or in combinations of two or more thereof.

The compound of the general formula (1) can be obtained by using a production method described in, for example, U.S. Pat. No. 4,905,0768, Japanese Patent Laid-Open No. S61-501089, H5-44946 or 2005-336155, or the like.

The proportion of the compound of the general formula (1) in the electrolyte solution is not particularly limited, but the compound is preferably included in a concentration of 0.005 to 10% by weight of the whole electrolyte solution. By setting the concentration of the compound represented by the general formula (1) to be 0.005% by weight or more, a sufficient filming effect can be obtained. The compound represented by the general formula (1) is more preferably added in a concentration of 0.01% by weight or more, and in this way, the battery properties can be further improved. By setting the concentration to be 10% by weight or less, the viscosity increase of the electrolyte solution and the resulting resistance increase can be suppressed. The compound is more preferably added in a concentration of 5% by weight or less, and in this way, the battery properties can further be improved.

The electrolyte solution according to the present embodiment is not particularly limited, but usually contains, in addition to a nonaqueous solvent (aprotic solvent) and a supporting electrolyte salt, the compound of the above general formula (1) as an additive.

As the supporting electrolyte salt, for example, a lithium salt can be used. Examples of the lithium salt include LiPF$_6$, lithium imide salt, LiAsF$_6$, LiAlCl$_4$, LiClO$_4$, LiBF$_4$ and LiSbF$_6$. Examples of the lithium imide salt include LiN(C$_k$F$_{2k+1}$SO$_2$)(C$_m$F$_{2m+1}$SO$_2$) (Here, k and m are each independently a natural number and are each preferably 1 or 2.). These may be used each alone or in combinations of two or more thereof.

The concentration of the lithium salt in the electrolyte solution is preferably 0.7 mol/L or more and 2.0 mol/L or less. By setting the concentration of the lithium salt to be 0.7 mol/L or more, a sufficient ionic conductivity is obtained. Also by setting the concentration of the lithium salt to be 2.0 mol/L or less, the viscosity can be decreased, and accordingly the migration of lithium ions is not hindered.

As the nonaqueous solvent, a solvent including at least one selected from the group consisting of cyclic carbonates, linear carbonates, aliphatic carboxylic acid esters, γ-lactones, cyclic ethers and linear ethers can be used. Examples of the cyclic carbonates include propylene carbonate (PC), ethylene carbonate (EC), butylene carbonate (BC), and the derivatives (inclusive of fluorinated compounds) of these. Examples of the linear carbonates include dimethyl carbonate (DMC), diethyl carbonate (DEC), ethyl methyl carbonate (EMC), dipropyl carbonate (DPC), and the derivatives (inclusive of fluorinated compounds) of these. Examples of the aliphatic carboxylic acid esters include methyl formate, methyl acetate, ethyl propionate, and the derivatives (inclusive of fluorinated compounds) of these. Examples of the γ-lactones include γ-butyrolactone and the derivatives (inclusive of fluorinated compounds) of this. Examples of the cyclic ethers include tetrahydrofuran, 2-methyltetrahydrofuran and the derivatives (inclusive of fluorinated compounds) of these. Examples of the linear ethers include 1,2-diethoxyethane (DEE), ethoxymethoxyethane (EME), ethyl ether, diethyl ether, and the derivatives (inclusive of fluorinated compounds) of these.

As the nonaqueous solvents, in addition to these, the following can also be used: dimethyl sulfoxide, formamide, acetamide, dimethyl formamide, dioxolane (for example, 1,3-dioxolane), acetonitrile, propionitrile, nitromethane, ethyl monoglyme, phosphoric acid triester, trimethoxymethane, dioxolane derivatives, sulfolane, methylsulfolane, 1,3-dimethyl-2-imidazolidinone, 3-methyl-2-oxazolidinone, 1,3-propanesultone, anisole, N-methylpyrrolidone, and the derivatives (inclusive of fluorinated compounds) of these.

The nonaqueous solvent especially preferably contains at least one selected from the group consisting of cyclic carbonates, chain carbonates, aliphatic carboxylate esters, γ-lactones, cyclic ethers, chain ethers, and fluorine derivatives of these compounds. Additionally, nonaqueous solvents may be used each alone or in combinations of two or more thereof.

The electrolyte solution of the present embodiment can further include a compound having at least one sulfonyl group. Here, the compound having at least one sulfonyl group (hereinafter, also referred to as a sulfonyl group-containing compound) is a compound different from the cyclic sulfonic acid ester represented by the general formula (1). Some of the sulfonyl group-containing compounds may overlap with the foregoing nonaqueous solvents; however, the "sulfonyl group-containing compound" is usually used together with at least one nonaqueous solvent selected from the group consisting of cyclic carbonates, linear carbonates, aliphatic carboxylic acid esters, γ-lactones, cyclic ethers, linear ethers, and the fluorine derivatives of these compounds.

As the sulfonyl group-containing compound, the sultone compounds represented by the following general formula (4) are preferable:

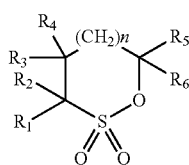

(4)

In the general formula (4), n represents an integer of 0 to 2, $R_1$ to $R_6$ each independently represent a hydrogen atom, an alkyl group having 1 to 12 carbon atoms, a cycloalkyl group having 3 to 6 carbon atoms, or an aryl group having 6 to 12 carbon atoms.

Examples of the compounds represented by the general formula (4) include cyclic sulfonic acid esters such as 1,3-propanesultone (PS), 1,4-butanesultone and 1,3-prop-2-enesultone.

The sulfonyl group-containing compound is used in a concentration of 0.005 to 10% by weight of the whole electrolyte solution.

The electrolyte solution of the present embodiment can further include vinylene carbonate or a derivative thereof. Examples of the vinylene carbonate or the derivative thereof may include: vinylene carbonates such as vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate and 4,5-diphenylvinylene carbonate; and vinylalkylene carbonates such as vinylethylene carbonate (VEC) and divinylethylene carbonate.

Vinylene carbonate or the derivative thereof is used in a concentration of 0.005 to 10% by weight of the whole electrolyte solution.

In the present embodiment, other additives other than the foregoing compounds can also be included in the electrolyte solution, if necessary. Examples of the other additives include an overcharge-preventing agent and a surfactant.

<Positive Electrode>

The positive electrode can be fabricated by forming a positive electrode active material layer containing a positive electrode active material and a positive electrode binder. In the nonaqueous electrolyte solution secondary battery of the FIGURE, the positive electrode active material to be used for the layer 1 containing the positive electrode active material is preferably a mixture of a lithium manganese composite oxide (sometimes referred to as "LMO") having a spinel structure and a lithium transition metal composite compound (sometimes referred to as a "layered Li compound") having a layered rock salt structure.

The LMO has a crystal structure which allows lithium ions to go therein and thereout three-dimensionally. Therefore, the output characteristics are excellent. That is, in order to improve the output as a secondary battery, the LMO is preferably used for the positive electrode.

On the other hand, the layered Li compound has a high energy density per weight, since the compound has a large amount per weight of chargeable and dischargeable lithium ions and has a higher redox potential (in the 4-V class) than sulfur (in the 2-V class) or the like. That is, the layered Li compound is preferably used as the positive electrode in order to improve the energy density as a secondary battery.

In order to satisfy the output characteristics and the energy density at the same time, the mixture of the LMO and the layered Li compound is preferably used. The mixing ratio in weight ratio at this time is preferably 15% by weight to 85% by weight defined as the LMO/(the LMO+the layered Li compound). When the mixing ratio is out of this range, the satisfaction of the output characteristics and the high energy density at the same time becomes insufficient.

The LMO is preferably a compound represented by the general formula (2).

$$Li(Mn_{1-\alpha}A_{\alpha})_2O_4 \quad (2)$$

In the general formula (2), A is one or two or more elements selected from the group consisting of Li, Mg, Al, Co and B; and α is 0≤α≤0.1. The compound specifically includes
$Li(Mn_{0.98}Li_{0.02})_2O_4$,
$Li(Mn_{0.95}Li_{0.05})_2O_4$,
$Li(Mn_{0.98}Mg_{0.02})_2O_4$,
$Li(Mn_{0.95}Mg_{0.05})_2O_4$,
$Li(Mn_{0.98}Al_{0.02})_2O_4$,
$Li(Mn_{0.95}Al_{0.05})_2O_4$,
$Li(Mn_{0.98}Al_{0.01}Co_{0.01})_2O_4$,
$Li(Mn_{0.95}Al_{0.025}Co_{0.025})_2O_4$,
$Li(Mn_{0.98}Li_{0.01}Mg_{0.01})_2O_4$,
$Li(Mn_{0.95}Li_{0.025}Mg_{0.025})_2O_4$,
$Li(Mn_{0.94}Li_{0.02}Mg_{0.02}B_{0.02})_2O_4$,
$Li(Mn_{0.98}Li_{0.01}Al_{0.01})_2O_4$,
$Li(Mn_{0.95}Li_{0.025}Al_{0.025})_2O_4$,
$Li(Mn_{0.94}Li_{0.025}Al_{0.025}B_{0.01})_2O_4$,
$Li(Mn_{0.97}Li_{0.01}Al_{0.01}Co_{0.01})_2O_4$,
$Li(Mn_{0.94}Li_{0.02}Al_{0.02}Co_{0.02})_2O_4$,
$Li(Mn_{0.93}Li_{0.02}Al_{0.02}Co_{0.02}B_{0.01})_2O_4$, and
$Li(Mn_{0.95}Li_{0.01}Mg_{0.01}Al_{0.01}Co_{0.01}B_{0.01})_2O_4$.

The positive electrode active material may contain one kind of the LMO singly, or a combination of two or more kinds of the LMO.

Then, a method for producing the LMO to be used in the present embodiment will be described. With respect to starting raw materials, there can be used, as a Li raw material, lithium hydroxide (LiOH), lithium carbonate ($Li_2CO_3$), lithium oxide ($Li_2O$), lithium sulfate ($Li_2SO_4$) and the like. Further as a Mn raw material, there can be used a hydroxide, a carbonate salt, a sulfate salt, an oxide and the like. In particular, manganese sulfate ($MnSO_4$) and manganese dioxide ($MnO_2$) are preferable. Further, electrolytic manganese dioxide is preferable. Further, for the element-substitution of Mn, a hydroxide, a carbonate salt, a sulfate salt, an oxide or the like of a substitution element and a Mn raw material are weighed so as to have a predetermined molar ratio, and mixed and calcined. Alternatively, by using manganese sulfate or the like, the substitution can be carried out in a solution. Thereafter, the lithium raw material and the Mn raw material are weighed so as to take a predetermined molar ratio, and mixed and fired to thereby obtain a desired LMO.

The layered Li compound is preferably a compound represented by the general formula (3).

$$Li_\beta MeO_2 \quad (3)$$

In the general formula (3), Me necessarily contains Ni, and contains one or two or more elements selected from the group consisting of Co, Al, Mn, Mg and Zr; and β is $0.98 \leq \beta \leq 1.02$. The compound specifically includes
$LiNi_{0.80}Co_{0.20}O_2$,
$LiNi_{0.80}Co_{0.15}Al_{0.05}O_2$,
$LiNi_{0.80}Mn_{0.10}Co_{0.10}O_2$,
$LiNi_{0.70}Mn_{0.20}Co_{0.10}O_2$,
$LiNi_{0.60}Mn_{0.20}Co_{0.20}O_2$,
$LiNi_{0.60}Mn_{0.20}Co_{0.20}O_2$,
$LiNi_{0.50}Mn_{0.30}Co_{0.20}O_2$,
$LiNi_{0.40}Mn_{0.30}Co_{0.30}O_2$,
$LiNi_{0.33}Mn_{0.33}Co_{0.33}O_2$,
$LiNi_{0.30}Mn_{0.30}Co_{0.30}Mg_{0.10}O_2$, and
$LiNi_{0.30}Mn_{0.30}Co_{0.30}Zr_{0.10}O_2$.

The positive electrode active material may contain one kind of the layered Li compound singly, or a combination of two or more kinds of the layered Li compound.

Then, a method for producing the layered Li compound to be used in the present embodiment will be described by taking as an example the case of a compound in which a part of Ni is substituted with Mn and Co. With respect to starting raw materials, there can be used, as a Li raw material, lithium hydroxide (LiOH), lithium carbonate ($Li_2CO_3$), lithium oxide ($Li_2O$), lithium sulfate ($Li_2SO_4$) and the like. Further as raw materials of Ni, Mn and Co, there can be used hydroxides, carbonate salts, sulfate salts, oxides and the like. The layered Li compound is especially preferably fabricated by a coprecipitation method. Thereafter, the lithium raw material and the raw materials of Ni, Mn and Co are weighed so as to have a predetermined molar ratio, and mixed and calcined, so that a desired layered Li compound can be obtained. At this time, β may be made to be other than 1, specifically $0.98 \leq \beta \leq 1.02$.

As the positive electrode binder, polyvinylidene fluoride (PVdF), vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide and polyamideimide can be used. Among these, from the viewpoint of versatility or low cost, polyvinylidene fluoride is preferable. The amount of the positive electrode binder to be used is preferably 2 to 10 parts by mass to 100 parts by mass of the positive electrode active material, from the viewpoint of the binding strength and energy density being in a trade-off relation with each other.

The positive electrode current collector is preferably aluminum, nickel, silver or an alloy thereof from the viewpoint of the electrochemical stability. Examples of the shape thereof include foil, flat plate and mesh.

The positive electrode can be obtained by dispersing and kneading, for example, active materials together with an electrically conductive material such as carbon black and a binder such as polyvinylidene fluoride (PVDF) in a solvent such as N-methyl-2-pyrrolidone (NMP), and applying the resulting mixture to the positive electrode current collector such as aluminum foil.

<Negative Electrode>

The negative electrode can be prepared by forming a negative electrode active material layer including a negative electrode active material and a negative electrode binder on a negative electrode current collector. In the nonaqueous electrolyte solution secondary battery of the FIGURE, for the negative electrode active material used for the layer 2 including the negative electrode active material, one or two or more materials selected from the group consisting of lithium metal, a lithium alloy and a material capable of absorbing and desorbing lithium can be used, for example. Examples of the material capable of absorbing and desorbing lithium ion include a carbon material or an oxide.

As the carbon material, lithium-absorbing materials such as graphite, amorphous carbon, diamond-like carbon, carbon nanotube, and the composite oxides of these can be used. Among these, a graphite material or amorphous carbon is preferable. In particular, the graphite material is preferable because it has high electron conductivity, is excellent in the adhesiveness with the current collector made of a metal such as copper and in the voltage flatness, contains small amount of impurities because of being formed at a high processing temperature, and thus is advantageous for the improvement of the negative electrode performances.

Examples of the oxide include silicon oxide, tin oxide, indium oxide, zinc oxide, lithium oxide, phosphorus oxide (phosphoric acid) and boron oxide (boric acid), and the composite products of these. In particular, it is preferable to include silicon oxide. As the structure, an amorphous state is preferable. This is because silicon oxide is stable and does not cause reaction with other compounds, and the amorphous structure does not lead to the degradation due to the nonuniformities such as grain boundary and defects. As the film formation method, methods such as a vapor deposition method, a CVD method, a sputtering method and the like can be employed.

A lithium alloy is constituted with lithium and a metal capable of forming an alloy with lithium. The lithium alloy is constituted with, for example, a binary alloy or a ternary or higher-order alloy composed of a metal such as Al, Si, Pb, Sn, In, Bi, Ag, Ba, Ca, Hg, Pd, Pt, Te, Zn and La, and lithium. As the lithium metal and the lithium alloy, amorphous materials are particularly preferable. This is because amorphous structure causes less degradation resulting from the nonuniformities such as grain boundary and defects. Lithium metal or a lithium alloy can be formed by an appropriate method such as a melt cooling method, a liquid quenching method, an atomizing method, a vacuum vapor deposition method, a sputtering method, a plasma CVD method, a light CVD method, a heat CVD method, or a sol-gel method.

As the negative electrode binder, polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide and polyamideimide and the like can be used. The amount of the negative electrode binder to be used is preferably 0.5 to 25 parts by mass to 100 parts by mass of the negative electrode active material, from the viewpoint of "sufficient binding strength" and "achievement of high energy" being in a trade-off relation with each other.

As the negative electrode current collector, aluminum, nickel, copper, silver, and alloys of these are preferable from the viewpoint of the electrochemical stability. Examples of the shape of the negative electrode current collector include foil, flat plate and mesh.

Examples of the method for forming the negative electrode active material layer include a doctor blade method, a die coater method, a CVD method and a sputtering method. After the negative electrode active material layer is formed beforehand, the negative electrode collector may also be formed by forming a thin film of aluminum, nickel or an alloy of these on the negative electrode active material layer by a method such as vapor deposition or sputtering.

EXAMPLES

Hereinafter, the present embodiment is described more specifically by way of Examples; however, the present invention is not limited to these Examples.

Example 1

(Preparation of Battery)

The fabrication of a battery of the present Example will be described. As a positive electrode current collector, an aluminum foil of 20 m in thickness was used; and as a positive electrode active material, a mixture of $Li(Mn_{0.95}Li_{0.01}Mg_{0.01}Al_{0.01}Co_{0.01}B_{0.01})_2O_4$ and $LiNi_{0.80}Co_{0.20}O_2$ in a weight ratio of 75:25 was used. Further as a positive electrode binder, a PVdF (manufactured by Kureha Corp., KF Polymer) was used; and as a conductivity imparting agent, an acetylene black (manufactured by Timcal Graphite & Carbon) was used. Further as a negative electrode current collector, a copper foil of 10 μm in thickness was used; and a negative electrode active material on the copper foil, a graphite was used. Further as a negative electrode binder, a PVdF (manufactured by Kureha Corp., KF Polymer) was used; and as a conductivity imparting agent, an acetylene black (manufactured by Timcal Graphite & Carbon) was used. Then, the negative electrode and the positive electrode were laminated through a separator composed of a polyethylene to thereby fabricate a secondary battery.

As a solvent for the nonaqueous electrolyte solution, a mixed solvent of EC and DEC (in volume ratio, EC/DEC=30/70) was used; and as a supporting electrolyte, $LiPF_6$ was dissolved in the nonaqueous electrolyte solution so as to have a concentration of 1 M.

As an additive, Compound No. 1 described in the above Table 1 was added to the nonaqueous electrolyte solution so as to have a concentration of 0.1 mol/L. A nonaqueous secondary battery was fabricated by using this nonaqueous electrolyte solution, and a storage test of the battery was carried out.

(Battery Storage Test)

First, charge and discharge were each carried out once at room temperature. The charge and discharge conditions at this time were a CCCV charge rate of 1.0 C, a CC discharge rate of 1.0 C, a charge termination voltage of 4.2 V, and a discharge termination voltage of 3.0V. Here, the 1.0 C refers to a current value at which the discharge is carried out completely in 1 hour from the fully charged state.

Thereafter, the battery was charged at a CCCV charge rate of 1.0 C up to a charge termination voltage of 4.2 V for 2.5 hours, and left as it was in a thermostatic bath at 45° C. for 4 weeks. After the being left, the battery was discharged at room temperature at a CC discharge rate of 1.0 C and a residual capacity thereof was acquired. 100×(the residual capacity)/(a charge capacity before the being left) (%) was taken as a residual capacity ratio (%). The results are shown in Table 2.

Comparative Example 1

A secondary battery was prepared in the same manner as in Example 1, except that methylene methanedisulfonic acid ester was used in place of Compound No. 1 in Example 1; and characteristics of the battery were measured in the same manner as in Example 1. The results are shown in Table 2. Here, in the Table, methylene methanedisulfonic acid ester is represented as "Compound A".

Example 2

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.50}Mn_{0.30}Co_{0.20}O_2$ in a weight ratio of 30:70 was used as a positive electrode active material; and characteristics of the battery were measured in the same manner as in Example 1. The results are shown in Table 2.

Example 3

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.80}Co_{0.20}O_2$ in a weight ratio of 75:25 was used as a positive electrode active material, and Compound No. 5 was used in place of Compound No. 1; and characteristics of the battery were measured in the same manner as in Example 1. The results are shown in Table 2.

Example 4

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.50}Mn_{0.30}CO_{0.20}O_2$ in a weight ratio of 30:70 was used as a positive electrode active material, and Compound No. 5 was used in place of Compound No. 1; and characteristics of the battery were measured in the same manner as in Example 1. The results are shown in Table 2.

Example 5

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.80}Co_{0.20}O_2$ in a weight ratio of 75:25 was used as a positive electrode active material, and Compound No. 7 was used in place of Compound No. 1; and characteristics of the battery were measured in the same manner as in Example 1. The results are shown in Table 2.

Example 6

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.50}Mn_{0.30}CO_{0.20}O_2$ in a weight ratio of 30:70 was used as a positive electrode active material, and Compound No. 7 was used in place of Compound No. 1; and characteristics of the battery were measured in the same manner as in Example 1. The results are shown in Table 2.

Example 7

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.80}Co_{0.20}O_2$ in a weight ratio of 75:25 was used as a positive electrode active material, and Compound No. 8 was used in place of Compound No. 1; and characteristics of the

Example 8

A secondary battery was prepared in the same manner as in Example 1, except that a mixture of Li(Mn$_{0.95}$Li$_{0.01}$Mg$_{0.01}$Al$_{0.01}$Co$_{0.01}$B$_{0.01}$)$_2$O$_4$ and LiNi$_{0.50}$Mn$_{0.30}$CO$_{0.20}$O$_2$ in a weight ratio of 30:70 was used as a positive electrode active material, and Compound No. 8 was used in place of Compound No. 1; and characteristics of the battery were measured in the same manner as in Example 1. The results are shown in Table 2.

Example 9

A secondary battery was prepared in the same manner as in Example 1, except that a mixture of Li(Mn$_{0.93}$Li$_{0.07}$)$_2$O$_4$ and LiNi$_{0.80}$Co$_{0.20}$O$_2$ in a weight ratio of 85:15 was used as a positive electrode active material, and Compound No. 9 was used in place of Compound No. 1; and characteristics of the battery were measured in the same manner as in Example 1. The results are shown in Table 2.

Example 10

A secondary battery was prepared in the same manner as in Example 1, except that a mixture of Li(Mn$_{0.93}$Li$_{0.07}$)$_2$O$_4$ and LiNi$_{0.80}$Co$_{0.20}$O$_2$ in a weight ratio of 50:50 was used as a positive electrode active material, and Compound No. 9 was used in place of Compound No. 1; and characteristics of the battery were measured in the same manner as in Example 1. The results are shown in Table 2.

Example 11

A secondary battery was prepared in the same manner as in Example 1, except that a mixture of Li(Mn$_{0.93}$Li$_{0.07}$)$_2$O$_4$ and LiNi$_{0.80}$Co$_{0.15}$Al$_{0.05}$O$_2$ in a weight ratio of 85:15 was used as a positive electrode active material, and Compound No. 9 was used in place of Compound No. 1; and characteristics of the battery were measured in the same manner as in Example 1. The results are shown in Table 2.

Example 12

A secondary battery was prepared in the same manner as in Example 1, except that a mixture of Li(Mn$_{0.93}$Li$_{0.07}$)$_2$O$_4$ and LiNi$_{0.80}$Co$_{0.15}$Al$_{0.05}$O$_2$ in a weight ratio of 50:50 was used as a positive electrode active material, and Compound No. 9 was used in place of Compound No. 1; and characteristics of the battery were measured in the same manner as in Example 1. The results are shown in Table 2.

Example 13

A secondary battery was prepared in the same manner as in Example 1, except that a mixture of Li(Mn$_{0.93}$Li$_{0.07}$)$_2$O$_4$ and LiNi$_{0.80}$Mn$_{0.10}$Co$_{0.10}$O$_2$ in a weight ratio of 85:15 was used as a positive electrode active material, and Compound No. 9 was used in place of Compound No. 1; and characteristics of the battery were measured in the same manner as in Example 1. The results are shown in Table 2.

Example 14

A secondary battery was prepared in the same manner as in Example 1, except that a mixture of Li(Mn$_{0.93}$Li$_{0.07}$)$_2$O$_4$ and LiNi$_{0.80}$Mn$_{0.10}$Co$_{0.10}$O$_2$ in a weight ratio of 50:50 was used as a positive electrode active material, and Compound No. 9 was used in place of Compound No. 1; and characteristics of the battery were measured in the same manner as in Example 1. The results are shown in Table 2.

Example 15

A secondary battery was prepared in the same manner as in Example 1, except that a mixture of Li(Mn$_{0.93}$Li$_{0.07}$)$_2$O$_4$ and LiNi$_{0.70}$Mn$_{0.20}$Co$_{0.10}$O$_2$ in a weight ratio of 85:15 was used as a positive electrode active material, and Compound No. 9 was used in place of Compound No. 1; and characteristics of the battery were measured in the same manner as in Example 1. The results are shown in Table 2.

Example 16

A secondary battery was prepared in the same manner as in Example 1, except that a mixture of Li(Mn$_{0.93}$Li$_{0.07}$)$_2$O$_4$ and LiNi$_{0.70}$Mn$_{0.20}$Co$_{0.10}$O$_2$ in a weight ratio of 50:50 was used as a positive electrode active material, and Compound No. 9 was used in place of Compound No. 1; and characteristics of the battery were measured in the same manner as in Example 1. The results are shown in Table 2.

Example 17

A secondary battery was prepared in the same manner as in Example 1, except that a mixture of Li(Mn$_{0.93}$Li$_{0.07}$)$_2$O$_4$ and LiNi$_{0.60}$Mn$_{0.20}$Co$_{0.20}$O$_2$ in a weight ratio of 85:15 was used as a positive electrode active material, and Compound No. 9 was used in place of Compound No. 1; and characteristics of the battery were measured in the same manner as in Example 1. The results are shown in Table 2.

Example 18

A secondary battery was prepared in the same manner as in Example 1, except that a mixture of Li(Mn$_{0.93}$Li$_{0.07}$)$_2$O$_4$ and LiNi$_{0.60}$Mn$_{0.20}$Co$_{0.20}$O$_2$ in a weight ratio of 50:50 was used as a positive electrode active material, and Compound No. 9 was used in place of Compound No. 1; and characteristics of the battery were measured in the same manner as in Example 1. The results are shown in Table 2.

Example 19

A secondary battery was prepared in the same manner as in Example 1, except that a mixture of Li(Mn$_{0.93}$Li$_{0.07}$)$_2$O$_4$ and LiNi$_{0.60}$Mn$_{0.20}$Co$_{0.20}$O$_2$ in a weight ratio of 30:70 was used as a positive electrode active material, and Compound No. 9 was used in place of Compound No. 1; and characteristics of the battery were measured in the same manner as in Example 1. The results are shown in Table 2.

Example 20

A secondary battery was prepared in the same manner as in Example 1, except that a mixture of Li(Mn$_{0.93}$Li$_{0.07}$)$_2$O$_4$ and LiNi$_{0.50}$Mn$_{0.30}$Co$_{0.20}$O$_2$ in a weight ratio of 85:15 was used as a positive electrode active material, and Compound No. 9 was used in place of Compound No. 1; and characteristics of the battery were measured in the same manner as in Example 1. The results are shown in Table 2.

Example 21

A secondary battery was prepared in the same manner as in Example 1, except that a mixture of Li(Mn$_{0.93}$Li$_{0.07}$)$_2$O$_4$ and LiNi$_{0.50}$Mn$_{0.30}$Co$_{0.20}$O$_2$ in a weight ratio of 50:50 was used as a positive electrode active material, and Compound No. 9 was used in place of Compound No. 1; and characteristics of the battery were measured in the same manner as in Example 1. The results are shown in Table 2.

Example 22

A secondary battery was prepared in the same manner as in Example 1, except that a mixture of Li(Mn$_{0.93}$Li$_{0.07}$)$_2$O$_4$ and LiNi$_{0.50}$Mn$_{0.30}$Co$_{0.20}$O$_2$ in a weight ratio of 30:70 was used as a positive electrode active material, and Compound No. 9 was used in place of Compound No. 1; and characteristics of the battery were measured in the same manner as in Example 1. The results are shown in Table 2.

Example 23

A secondary battery was prepared in the same manner as in Example 1, except that a mixture of Li(Mn$_{0.95}$Li$_{0.025}$Mg$_{0.025}$)$_2$O$_4$ and LiNi$_{0.80}$Co$_{0.20}$O$_2$ in a weight ratio of 85:15 was used as a positive electrode active material, and Compound No. 9 was used in place of Compound No. 1; and characteristics of the battery were measured in the same manner as in Example 1. The results are shown in Table 3.

Example 24

A secondary battery was prepared in the same manner as in Example 1, except that a mixture of Li(Mn$_{0.95}$Li$_{0.025}$Mg$_{0.025}$)$_2$O$_4$ and LiNi$_{0.80}$Co$_{0.20}$O$_2$ in a weight ratio of 50:50 was used as a positive electrode active material, and Compound No. 9 was used in place of Compound No. 1; and characteristics of the battery were measured in the same manner as in Example 1. The results are shown in Table 3.

Example 25

A secondary battery was prepared in the same manner as in Example 1, except that a mixture of Li(Mn$_{0.95}$Li$_{0.025}$Mg$_{0.025}$)$_2$O$_4$ and LiNi$_{0.80}$Co$_{0.15}$Al$_{0.05}$O$_2$ in a weight ratio of 85:15 was used as a positive electrode active material, and Compound No. 9 was used in place of Compound No. 1; and characteristics of the battery were measured in the same manner as in Example 1. The results are shown in Table 3.

Example 26

A secondary battery was prepared in the same manner as in Example 1, except that a mixture of Li(Mn$_{0.95}$Li$_{0.025}$Mg$_{0.025}$)$_2$O$_4$ and LiNi$_{0.80}$Co$_{0.15}$Al$_{0.05}$O$_2$ in a weight ratio of 50:50 was used as a positive electrode active material, and Compound No. 9 was used in place of Compound No. 1; and characteristics of the battery were measured in the same manner as in Example 1. The results are shown in Table 3.

Example 27

A secondary battery was prepared in the same manner as in Example 1, except that a mixture of Li(Mn$_{0.95}$Li$_{0.025}$Mg$_{0.025}$)$_2$O$_4$ and LiNi$_{0.80}$Mn$_{0.10}$Co$_{0.10}$O$_2$ in a weight ratio of 85:15 was used as a positive electrode active material, and Compound No. 9 was used in place of Compound No. 1; and characteristics of the battery were measured in the same manner as in Example 1. The results are shown in Table 3.

Example 28

A secondary battery was prepared in the same manner as in Example 1, except that a mixture of Li(Mn$_{0.95}$Li$_{0.025}$Mg$_{0.025}$)$_2$O$_4$ and LiNi$_{0.80}$Mn$_{0.10}$Co$_{0.10}$O$_2$ in a weight ratio of 50:50 was used as a positive electrode active material, and Compound No. 9 was used in place of Compound No. 1; and characteristics of the battery were measured in the same manner as in Example 1. The results are shown in Table 3.

Example 29

A secondary battery was prepared in the same manner as in Example 1, except that a mixture of Li(Mn$_{0.95}$Li$_{0.025}$Mg$_{0.025}$)$_2$O$_4$ and LiNi$_{0.70}$Mn$_{0.20}$Co$_{0.10}$O$_2$ in a weight ratio of 85:15 was used as a positive electrode active material, and Compound No. 9 was used in place of Compound No. 1; and characteristics of the battery were measured in the same manner as in Example 1. The results are shown in Table 3.

Example 30

A secondary battery was prepared in the same manner as in Example 1, except that a mixture of Li(Mn$_{0.95}$Li$_{0.025}$Mg$_{0.025}$)$_2$O$_4$ and LiNi$_{0.70}$Mn$_{0.20}$Co$_{0.10}$O$_2$ in a weight ratio of 50:50 was used as a positive electrode active material, and Compound No. 9 was used in place of Compound No. 1; and characteristics of the battery were measured in the same manner as in Example 1. The results are shown in Table 3.

Example 31

A secondary battery was prepared in the same manner as in Example 1, except that a mixture of Li(Mn$_{0.95}$Li$_{0.025}$Mg$_{0.025}$)$_2$O$_4$ and LiNi$_{0.60}$Mn$_{0.20}$Co$_{0.20}$O$_2$ in a weight ratio of 85:15 was used as a positive electrode active material, and Compound No. 9 was used in place of Compound No. 1; and characteristics of the battery were measured in the same manner as in Example 1. The results are shown in Table 3.

Example 32

A secondary battery was prepared in the same manner as in Example 1, except that a mixture of Li(Mn$_{0.95}$Li$_{0.025}$Mg$_{0.025}$)$_2$O$_4$ and LiNi$_{0.60}$Mn$_{0.20}$Co$_{0.20}$O$_2$ in a weight ratio of 50:50 was used as a positive electrode active material, and Compound No. 9 was used in place of Compound No. 1; and characteristics of the battery were measured in the same manner as in Example 1. The results are shown in Table 3.

Example 33

A secondary battery was prepared in the same manner as in Example 1, except that a mixture of Li(Mn$_{0.95}$Li$_{0.025}$Mg$_{0.025}$)$_2$O$_4$ and LiNi$_{0.60}$Mn$_{0.20}$Co$_{0.20}$O$_2$ in a weight ratio of 30:70 was used as a positive electrode active material, and Compound No. 9 was used in place of Compound No. 1; and characteristics of the battery were measured in the same manner as in Example 1. The results are shown in Table 3.

Example 34

A secondary battery was prepared in the same manner as in Example 1, except that a mixture of $Li(Mn_{0.95}Li_{0.025}Mg_{0.025})_2O_4$ and $LiNi_{0.50}Mn_{0.30}Co_{0.20}O_2$ in a weight ratio of 85:15 was used as a positive electrode active material, and Compound No. 9 was used in place of Compound No. 1; and characteristics of the battery were measured in the same manner as in Example 1. The results are shown in Table 3.

Example 35

A secondary battery was prepared in the same manner as in Example 1, except that a mixture of $Li(Mn_{0.95}Li_{0.025}Mg_{0.025})_2O_4$ and $LiNi_{0.50}Mn_{0.30}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 3.

Example 36

A secondary battery was prepared in the same manner as in Example 1, except that a mixture of $Li(Mn_{0.95}Li_{0.025}Mg_{0.025})_2O_4$ and $LiNi_{0.50}Mn_{0.30}Co_{0.20}O_2$ in a weight ratio of 30:70 was used as a positive electrode active material, and Compound No. 9 was used in place of Compound No. 1; and characteristics of the battery were measured in the same manner as in Example 1. The results are shown in Table 3.

Example 37

A secondary battery was prepared in the same manner as in Example 1, except that a mixture of $Li(Mn_{0.94}Li_{0.025}Al_{0.025}B_{0.01})_2O_4$ and $LiNi_{0.80}Co_{0.20}O_2$ in a weight ratio of 85:15 was used as a positive electrode active material, and Compound No. 9 was used in place of Compound No. 1; and characteristics of the battery were measured in the same manner as in Example 1. The results are shown in Table 3.

Example 38

A secondary battery was prepared in the same manner as in Example 1, except that a mixture of $Li(Mn_{0.94}Li_{0.025}Al_{0.025}B_{0.01})_2O_4$ and $LiNi_{0.80}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 3.

Example 39

A secondary battery was prepared in the same manner as in Example 1, except that a mixture of $Li(Mn_{0.94}Li_{0.025}Al_{0.025}B_{0.01})_2O_4$ and $LiNi_{0.80}Co_{0.15}Al_{0.05}O_2$ in a weight ratio of 85:15 was used as a positive electrode active material, and Compound No. 9 was used in place of Compound No. 1; and characteristics of the battery were measured in the same manner as in Example 1. The results are shown in Table 3.

Example 40

A secondary battery was prepared in the same manner as in Example 1, except that a mixture of $Li(Mn_{0.94}Li_{0.025}Al_{0.025}B_{0.01})_2O_4$ and $LiNi_{0.80}Co_{0.15}Al_{0.05}O_2$ in a weight ratio of 50:50 was used as a positive electrode active material, and Compound No. 9 was used in place of Compound No. 1; and characteristics of the battery were measured in the same manner as in Example 1. The results are shown in Table 3.

Example 41

A secondary battery was prepared in the same manner as in Example 1, except that a mixture of $Li(Mn_{0.94}Li_{0.025}Al_{0.025}B_{0.01})_2O_4$ and $LiNi_{0.80}Mn_{0.10}Co_{0.10}O_2$ in a weight ratio of 85:15 was used as a positive electrode active material, and Compound No. 9 was used in place of Compound No. 1; and characteristics of the battery were measured in the same manner as in Example 1. The results are shown in Table 3.

Example 42

A secondary battery was prepared in the same manner as in Example 1, except that a mixture of $Li(Mn_{0.94}Li_{0.025}Al_{0.025}B_{0.01})_2O_4$ and $LiNi_{0.80}Mn_{0.10}Co_{0.10}O_2$ in a weight ratio of 50:50 was used as a positive electrode active material, and Compound No. 9 was used in place of Compound No. 1; and characteristics of the battery were measured in the same manner as in Example 1. The results are shown in Table 3.

Example 43

A secondary battery was prepared in the same manner as in Example 1, except that a mixture of $Li(Mn_{0.94}Li_{0.025}Al_{0.025}B_{0.01})_2O_4$ and $LiNi_{0.70}Mn_{0.20}Co_{0.10}O_2$ in a weight ratio of 85:15 was used as a positive electrode active material, and Compound No. 9 was used in place of Compound No. 1; and characteristics of the battery were measured in the same manner as in Example 1. The results are shown in Table 3.

Example 44

A secondary battery was prepared in the same manner as in Example 1, except that a mixture of $Li(Mn_{0.94}Li_{0.025}Al_{0.025}B_{0.01})_2O_4$ and $LiNi_{0.70}Mn_{0.20}Co_{0.10}O_2$ in a weight ratio of 50:50 was used as a positive electrode active material, and Compound No. 9 was used in place of Compound No. 1; and characteristics of the battery were measured in the same manner as in Example 1. The results are shown in Table 3.

Example 45

A secondary battery was prepared in the same manner as in Example 1, except that a mixture of $Li(Mn_{0.94}Li_{0.025}Al_{0.025}B_{0.01})_2O_4$ and $LiNi_{0.60}Mn_{0.20}Co_{0.20}O_2$ in a weight ratio of 85:15 was used as a positive electrode active material, and Compound No. 9 was used in place of Compound No. 1; and characteristics of

Example 46

A secondary battery was prepared in the same manner as in Example 1, except that a mixture of $Li(Mn_{0.94}Li_{0.025}Al_{0.025}B_{0.01})_2O_4$ and $LiNi_{0.60}Mn_{0.20}C_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 3.

Example 47

A secondary battery was prepared in the same manner as in Example 1, except that a mixture of $Li(Mn_{0.94}Li_{0.025}Al_{0.025}B_{0.01})_2O_4$ and $LiNi_{0.60}Mn_{0.20}C_{0.20}O_2$ in a weight ratio of 30:70 was used as a positive electrode active material, and Compound No. 9 was used in place of Compound No. 1; and characteristics of the battery were measured in the same manner as in Example 1. The results are shown in Table 3.

Example 48

A secondary battery was prepared in the same manner as in Example 1, except that a mixture of $Li(Mn_{0.94}Li_{0.025}Al_{0.025}B_{0.01})_2O_4$ and $LiNi_{0.50}Mn_{0.30}C_{0.20}O_2$ in a weight ratio of 85:15 was used as a positive electrode active material, and Compound No. 9 was used in place of Compound No. 1; and characteristics of the battery were measured in the same manner as in Example 1. The results are shown in Table 3.

Example 49

A secondary battery was prepared in the same manner as in Example 1, except that a mixture of $Li(Mn_{0.94}Li_{0.025}Al_{0.025}B_{0.01})_2O_4$ and $LiNi_{0.50}Mn_{0.30}C_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 3.

Example 50

A secondary battery was prepared in the same manner as in Example 1, except that a mixture of $Li(Mn_{0.94}Li_{0.025}Al_{0.025}B_{0.01})_2O_4$ and $LiNi_{0.50}Mn_{0.30}C_{0.20}O_2$ in a weight ratio of 30:70 was used as a positive electrode active material, and Compound No. 9 was used in place of Compound No. 1; and characteristics of the battery were measured in the same manner as in Example 1. The results are shown in Table 3.

Example 51

A secondary battery was prepared in the same manner as in Example 1, except that a mixture of $Li(Mn_{0.94}Li_{0.02}Al_{0.02}Co_{0.02})_2O_4$ and $LiNi_{0.80}Co_{0.20}O_2$ in a weight ratio of 85:15 was used as a positive electrode active material, and Compound No. 9 was used in place of Compound No. 1; and characteristics of the battery were measured in the same manner as in Example 1. The results are shown in Table 4.

Example 52

A secondary battery was prepared in the same manner as in Example 1, except that a mixture of $Li(Mn_{0.94}Li_{0.02}Al_{0.02}Co_{0.02})_2O_4$ and $LiNi_{0.80}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 4.

Example 53

A secondary battery was prepared in the same manner as in Example 1, except that a mixture of $Li(Mn_{0.94}Li_{0.02}Al_{0.02}Co_{0.02})_2O_4$ and $LiNi_{0.80}Co_{0.15}Al_{0.05}O_2$ in a weight ratio of 85:15 was used as a positive electrode active material, and Compound No. 9 was used in place of Compound No. 1; and characteristics of the battery were measured in the same manner as in Example 1. The results are shown in Table 4.

Example 54

A secondary battery was prepared in the same manner as in Example 1, except that a mixture of $Li(Mn_{0.94}Li_{0.02}Al_{0.02}Co_{0.02})_2O_4$ and $LiNi_{0.80}Co_{0.15}Al_{0.05}O_2$ in a weight ratio of 50:50 was used as a positive electrode active material, and Compound No. 9 was used in place of Compound No. 1; and characteristics of the battery were measured in the same manner as in Example 1. The results are shown in Table 4.

Example 55

A secondary battery was prepared in the same manner as in Example 1, except that a mixture of $Li(Mn_{0.94}Li_{0.02}Al_{0.02}Co_{0.02})_2O_4$ and $LiNi_{0.80}Mn_{0.10}Co_{0.10}O_2$ in a weight ratio of 85:15 was used as a positive electrode active material, and Compound No. 9 was used in place of Compound No. 1; and characteristics of the battery were measured in the same manner as in Example 1. The results are shown in Table 4.

Example 56

A secondary battery was prepared in the same manner as in Example 1, except that a mixture of $Li(Mn_{0.94}Li_{0.02}Al_{0.02}Co_{0.02})_2O_4$ and $LiNi_{0.80}Mn_{0.10}Co_{0.10}O_2$ in a weight ratio of 50:50 was used as a positive electrode active material, and Compound No. 9 was used in place of Compound No. 1; and characteristics of the battery were measured in the same manner as in Example 1. The results are shown in Table 4.

Example 57

A secondary battery was prepared in the same manner as in Example 1, except that a mixture of $Li(Mn_{0.94}Li_{0.02}Al_{0.02}Co_{0.02})_2O_4$ and $LiNi_{0.70}Mn_{0.20}Co_{0.10}O_2$ in a weight ratio of 85:15 was used as a positive electrode active material, and Compound No. 9 was used in place of Compound No. 1; and characteristics of the battery were measured in the same manner as in Example 1. The results are shown in Table 4.

Example 58

A secondary battery was prepared in the same manner as in Example 1, except that a mixture of Li(Mn$_{0.94}$Li$_{0.02}$Al$_{0.02}$Co$_{0.02}$)$_2$O$_4$ and LiNi$_{0.70}$Mn$_{0.20}$Co$_{0.10}$O$_2$ in a weight ratio of 50:50 was used as a positive electrode active material, and Compound No. 9 was used in place of Compound No. 1; and characteristics of the battery were measured in the same manner as in Example 1. The results are shown in Table 4.

Example 59

A secondary battery was prepared in the same manner as in Example 1, except that a mixture of Li(Mn$_{0.94}$Li$_{0.02}$Al$_{0.02}$Co$_{0.02}$)$_2$O$_4$ and LiNi$_{0.60}$Mn$_{0.20}$Co$_{0.20}$O$_2$ in a weight ratio of 85:15 was used as a positive electrode active material, and Compound No. 9 was used in place of Compound No. 1; and characteristics of the battery were measured in the same manner as in Example 1. The results are shown in Table 4.

Example 60

A secondary battery was prepared in the same manner as in Example 1, except that a mixture of Li(Mn$_{0.94}$Li$_{0.02}$Al$_{0.02}$Co$_{0.02}$)$_2$O$_4$ and LiNi$_{0.60}$Mn$_{0.20}$Co$_{0.20}$O$_2$ in a weight ratio of 50:50 was used as a positive electrode active material, and Compound No. 9 was used in place of Compound No. 1; and characteristics of the battery were measured in the same manner as in Example 1. The results are shown in Table 4.

Example 61

A secondary battery was prepared in the same manner as in Example 1, except that a mixture of Li(Mn$_{0.94}$Li$_{0.02}$Al$_{0.02}$Co$_{0.02}$)$_2$O$_4$ and LiNi$_{0.60}$Mn$_{0.20}$Co$_{0.20}$O$_2$ in a weight ratio of 30:70 was used as a positive electrode active material, and Compound No. 9 was used in place of Compound No. 1; and characteristics of the battery were measured in the same manner as in Example 1. The results are shown in Table 4.

Example 62

A secondary battery was prepared in the same manner as in Example 1, except that a mixture of Li(Mn$_{0.94}$Li$_{0.02}$Al$_{0.02}$Co$_{0.02}$)$_2$O$_4$ and LiNi$_{0.50}$Mn$_{0.30}$Co$_{0.20}$O$_2$ in a weight ratio of 85:15 was used as a positive electrode active material, and Compound No. 9 was used in place of Compound No. 1; and characteristics of the battery were measured in the same manner as in Example 1. The results are shown in Table 4.

Example 63

A secondary battery was prepared in the same manner as in Example 1, except that a mixture of Li(Mn$_{0.94}$Li$_{0.02}$Al$_{0.02}$Co$_{0.02}$)$_2$O$_4$ and LiNi$_{0.50}$Mn$_{0.30}$Co$_{0.20}$O$_2$ in a weight ratio of 50:50 was used as a positive electrode active material, and Compound No. 9 was used in place of Compound No. 1; and characteristics of the battery were measured in the same manner as in Example 1. The results are shown in Table 4.

Example 64

A secondary battery was prepared in the same manner as in Example 1, except that a mixture of Li(Mn$_{0.94}$Li$_{0.02}$Al$_{0.02}$Co$_{0.02}$)$_2$O$_4$ and LiNi$_{0.50}$Mn$_{0.30}$Co$_{0.20}$O$_2$ in a weight ratio of 30:70 was used as a positive electrode active material, and Compound No. 9 was used in place of Compound No. 1; and characteristics of the battery were measured in the same manner as in Example 1. The results are shown in Table 4.

Example 65

A secondary battery was prepared in the same manner as in Example 1, except that a mixture of Li(Mn$_{0.95}$Li$_{0.01}$Mg$_{0.01}$Al$_{0.01}$Co$_{0.01}$B$_{0.01}$)$_2$O$_4$ and LiNi$_{0.80}$Co$_{0.20}$O$_2$ in a weight ratio of 85:15 was used as a positive electrode active material, and Compound No. 9 was used in place of Compound No. 1; and characteristics of the battery were measured in the same manner as in Example 1. The results are shown in Table 4.

Example 66

A secondary battery was prepared in the same manner as in Example 1, except that a mixture of Li(Mn$_{0.95}$Li$_{0.01}$Mg$_{0.01}$Al$_{0.01}$Co$_{0.01}$B$_{0.01}$)$_2$O$_4$ and LiNi$_{0.80}$Co$_{0.20}$O$_2$ in a weight ratio of 50:50 was used as a positive electrode active material, and Compound No. 9 was used in place of Compound No. 1; and characteristics of the battery were measured in the same manner as in Example 1. The results are shown in Table 4.

Example 67

A secondary battery was prepared in the same manner as in Example 1, except that a mixture of Li(Mn$_{0.95}$Li$_{0.01}$Mg$_{0.01}$Al$_{0.01}$Co$_{0.01}$B$_{0.01}$)$_2$O$_4$ and LiNi$_{0.80}$Co$_{0.15}$Al$_{0.05}$O$_2$ in a weight ratio of 85:15 was used as a positive electrode active material, and Compound No. 9 was used in place of Compound No. 1; and characteristics of the battery were measured in the same manner as in Example 1. The results are shown in Table 4.

Example 68

A secondary battery was prepared in the same manner as in Example 1, except that a mixture of Li(Mn$_{0.95}$Li$_{0.01}$Mg$_{0.01}$Al$_{0.01}$Co$_{0.01}$B$_{0.01}$)$_2$O$_4$ and LiNi$_{0.80}$Co$_{0.15}$Al$_{0.05}$O$_2$ in a weight ratio of 50:50 was used as a positive electrode active material, and Compound No. 9 was used in place of Compound No. 1; and characteristics of the battery were measured in the same manner as in Example 1. The results are shown in Table 4.

Example 69

A secondary battery was prepared in the same manner as in Example 1, except that a mixture of Li(Mn$_{0.95}$Li$_{0.01}$Mg$_{0.01}$Al$_{0.01}$Co$_{0.01}$B$_{0.01}$)$_2$O$_4$ and LiNi$_{0.80}$Mn$_{0.10}$Co$_{0.10}$O$_2$ in a weight ratio of 85:15 was used as a positive electrode active material, and Compound No. 9 was used in place of Compound No. 1; and characteristics of the battery were measured in the same manner as in Example 1. The results are shown in Table 4.

Example 70

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.80}Mn_{0.10}Co_{0.10}O_2$ in a weight ratio of 50:50 was used as a positive electrode active material, and Compound No. 9 was used in place of Compound No. 1; and characteristics of the battery were measured in the same manner as in Example 1. The results are shown in Table 4.

Example 71

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.70}Mn_{0.20}Co_{0.10}O_2$ in a weight ratio of 85:15 was used as a positive electrode active material, and Compound No. 9 was used in place of Compound No. 1; and characteristics of the battery were measured in the same manner as in Example 1. The results are shown in Table 4.

Example 72

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.70}Mn_{0.20}Co_{0.10}O_2$ in a weight ratio of 50:50 was used as a positive electrode active material, and Compound No. 9 was used in place of Compound No. 1; and characteristics of the battery were measured in the same manner as in Example 1. The results are shown in Table 4.

Example 73

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.60}Mn_{0.20}Co_{0.20}O_2$ in a weight ratio of 85:15 was used as a positive electrode active material, and Compound No. 9 was used in place of Compound No. 1; and characteristics of the battery were measured in the same manner as in Example 1. The results are shown in Table 4.

Example 74

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.60}Mn_{0.20}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 4.

Example 75

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.60}Mn_{0.20}Co_{0.20}O_2$ in a weight ratio of 30:70 was used as a positive electrode active material, and Compound No. 9 was used in place of Compound No. 1; and characteristics of the battery were measured in the same manner as in Example 1. The results are shown in Table 4.

Example 76

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.50}Mn_{0.30}Co_{0.20}O_2$ in a weight ratio of 85:15 was used as a positive electrode active material, and Compound No. 9 was used in place of Compound No. 1; and characteristics of the battery were measured in the same manner as in Example 1. The results are shown in Table 4.

Example 77

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.50}Mn_{0.30}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 4.

Example 78

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.50}Mn_{0.30}Co_{0.20}O_2$ in a weight ratio of 30:70 was used as a positive electrode active material, and Compound No. 9 was used in place of Compound No. 1; and characteristics of the battery were measured in the same manner as in Example 1. The results are shown in Table 4.

Example 79

A secondary battery was prepared in the same manner as in Example 1, except that a mixture of $Li(Mn_{0.98}Li_{0.02})_2O_4$ and $LiNi_{0.50}Mn_{0.30}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 5.

Example 80

A secondary battery was prepared in the same manner as in Example 1, except that a mixture of $Li(Mn_{0.95}Mg_{0.05})_2O_4$ and $LiNi_{0.50}Mn_{0.30}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 5.

Example 81

A secondary battery was prepared in the same manner as in Example 1, except that a mixture of $Li(Mn_{0.95}Al_{0.05})_2O_4$ and $LiNi_{0.50}Mn_{0.30}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 5.

Example 82

A secondary battery was prepared in the same manner as in Example 1, except that a mixture of $Li(Mn_{0.95}Al_{0.025}Co_{0.025})_2O_4$ and $LiNi_{0.50}Mn_{0.30}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 5.

Example 83

A secondary battery was prepared in the same manner as in Example 1, except that a mixture of $Li(Mn_{0.95}Li_{0.01}Mg_{0.01})_2O_4$ and $LiNi_{0.50}Mn_{0.30}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 5.

Example 84

A secondary battery was prepared in the same manner as in Example 1, except that a mixture of $Li(Mn_{0.94}Li_{0.02}Mg_{0.02}B_{0.02})_2O_4$ and $LiNi_{0.50}Mn_{0.30}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 5.

Example 85

A secondary battery was prepared in the same manner as in Example 1, except that a mixture of $Li(Mn_{0.98}Li_{0.01}Al_{0.01})_2O_4$ and $LiNi_{0.50}Mn_{0.30}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 5.

Example 86

A secondary battery was prepared in the same manner as in Example 1, except that a mixture of $Li(Mn_{0.95}Li_{0.025}Al_{0.025})_2O_4$ and $LiNi_{0.50}Mn_{0.30}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 5.

Example 87

A secondary battery was prepared in the same manner as in Example 1, except that a mixture of $Li(Mn_{0.97}Li_{0.01}Al_{0.01}Co_{0.01})_2O_4$ and $LiNi_{0.50}Mn_{0.30}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 5.

Example 88

A secondary battery was prepared in the same manner as in Example 1, except that a mixture of $Li(Mn_{0.93}Li_{0.02}Al_{0.02}Co_{0.02}B_{0.01})_2O_4$ and $LiNi_{0.50}Mn_{0.30}Co_{0.20}O_2$ in a weight ratio of 50:50 was used as a positive electrode active material, and Compound No. 9 was used in place of Compound No. 1; and characteristics of the battery were measured in the same manner as in Example 1. The results are shown in Table 5.

Example 89

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.40}Mn_{0.30}Co_{0.30}O_2$ in a weight ratio of 50:50 was used as a positive electrode active material, and Compound No. 9 was used in place of Compound No. 1; and characteristics of the battery were measured in the same manner as in Example 1. The results are shown in Table 5.

Example 90

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.33}Mn_{0.33}Co_{0.33}O_2$ in a weight ratio of 50:50 was used as a positive electrode active material, and Compound No. 9 was used in place of Compound No. 1; and characteristics of the battery were measured in the same manner as in Example 1. The results are shown in Table 5.

Example 91

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.30}Mn_{0.30}Co_{0.30}Mg_{0.10}O_2$ in a weight ratio of 50:50 was used as a positive electrode active material, and Compound No. 9 was used in place of Compound No. 1; and characteristics of the battery were measured in the same manner as in Example 1. The results are shown in Table 5.

Example 92

A secondary battery was prepared in the same manner as in Example 1, except that a mixture of $Li(Mn_{0.95}Li_{0.01}Mg_{0.01}Al_{0.01}Co_{0.01}B_{0.01})_2O_4$ and $LiNi_{0.30}Mn_{0.30}Co_{0.30}Zr_{0.10}O_2$ in a weight ratio of 50:50 was used as a positive electrode active material, and Compound No. 9 was used in place of Compound No. 1; and characteristics of the battery were measured in the same manner as in Example 1. The results are shown in Table 5.

TABLE 2

| | Compound No. | LMO | Layered Li Compound | Ratio of LMO/Li Layered Compound (weight ratio) | Residual Capacity Ratio (%) |
|---|---|---|---|---|---|
| Ex. 1 | 1 | $Li(Mn_{0.95}Li_{0.01}Mg_{0.01}Al_{0.01}Co_{0.01}B_{0.01})_2O_4$ | $LiNi_{0.80}Co_{0.20}O_2$ | 75/25 | 71 |
| Com-Ex. 1 | A | $Li(Mn_{0.95}Li_{0.01}Mg_{0.01}Al_{0.01}Co_{0.01}B_{0.01})_2O_4$ | $LiNi_{0.80}Co_{0.20}O_2$ | 75/25 | 61 |
| Ex. 2 | 1 | $Li(Mn_{0.95}Li_{0.01}Mg_{0.01}Al_{0.01}Co_{0.01}B_{0.01})_2O_4$ | $LiNi_{0.50}Mn_{0.30}Co_{0.20}O_2$ | 30/70 | 72 |

TABLE 2-continued

| | Compound No. | LMO | Layered Li Compound | Ratio of LMO/Li Layered Compound (weight ratio) | Residual Capacity Ratio (%) |
|---|---|---|---|---|---|
| Ex. 3 | 5 | $Li(Mn_{0.95}Li_{0.01}Mg_{0.01}Al_{0.01}Co_{0.01}B_{0.01})_2O_4$ | $LiNi_{0.80}Co_{0.20}O_2$ | 75/25 | 70 |
| Ex. 4 | 5 | $Li(Mn_{0.95}Li_{0.01}Mg_{0.01}Al_{0.01}Co_{0.01}B_{0.01})_2O_4$ | $LiNi_{0.50}Mn_{0.30}Co_{0.20}O_2$ | 30/70 | 72 |
| Ex. 5 | 7 | $Li(Mn_{0.95}Li_{0.01}Mg_{0.01}Al_{0.01}Co_{0.01}B_{0.01})_2O_4$ | $LiNi_{0.80}Co_{0.20}O_2$ | 75/25 | 72 |
| Ex. 6 | 7 | $Li(Mn_{0.95}Li_{0.01}Mg_{0.01}Al_{0.01}Co_{0.01}B_{0.01})_2O_4$ | $LiNi_{0.50}Mn_{0.30}Co_{0.20}O_2$ | 30/70 | 74 |
| Ex. 7 | 8 | $Li(Mn_{0.95}Li_{0.01}Mg_{0.01}Al_{0.01}Co_{0.01}B_{0.01})_2O_4$ | $LiNi_{0.80}Co_{0.20}O_2$ | 75/25 | 75 |
| Ex. 8 | 8 | $Li(Mn_{0.95}Li_{0.01}Mg_{0.01}Al_{0.01}Co_{0.01}B_{0.01})_2O_4$ | $LiNi_{0.50}Mn_{0.30}Co_{0.20}O_2$ | 30/70 | 76 |
| Ex. 9 | 9 | $Li(Mn_{0.93}Li_{0.07})_2O_4$ | $LiNi_{0.80}Co_{0.20}O_2$ | 85/15 | 82 |
| Ex. 10 | 9 | $Li(Mn_{0.93}Li_{0.07})_2O_4$ | $LiNi_{0.80}Co_{0.20}O_2$ | 50/50 | 85 |
| Ex. 11 | 9 | $Li(Mn_{0.93}Li_{0.07})_2O_4$ | $LiNi_{0.80}Co_{0.15}Al_{0.05}O_2$ | 85/15 | 83 |
| Ex. 12 | 9 | $Li(Mn_{0.93}Li_{0.07})_2O_4$ | $LiNi_{0.80}Co_{0.15}Al_{0.05}O_2$ | 50/50 | 86 |
| Ex. 13 | 9 | $Li(Mn_{0.93}Li_{0.07})_2O_4$ | $LiNi_{0.80}Mn_{0.10}Co_{0.10}O_2$ | 85/15 | 81 |
| Ex. 14 | 9 | $Li(Mn_{0.93}Li_{0.07})_2O_4$ | $LiNi_{0.80}Mn_{0.10}Co_{0.10}O_2$ | 50/50 | 84 |
| Ex. 15 | 9 | $Li(Mn_{0.93}Li_{0.07})_2O_4$ | $LiNi_{0.70}Mn_{0.20}Co_{0.10}O_2$ | 85/15 | 82 |
| Ex. 16 | 9 | $Li(Mn_{0.93}Li_{0.07})_2O_4$ | $LiNi_{0.70}Mn_{0.20}Co_{0.10}O_2$ | 50/50 | 83 |
| Ex. 17 | 9 | $Li(Mn_{0.93}Li_{0.07})_2O_4$ | $LiNi_{0.60}Mn_{0.20}Co_{0.20}O_2$ | 85/15 | 79 |
| Ex. 18 | 9 | $Li(Mn_{0.93}Li_{0.07})_2O_4$ | $LiNi_{0.60}Mn_{0.20}Co_{0.20}O_2$ | 50/50 | 85 |
| Ex. 19 | 9 | $Li(Mn_{0.93}Li_{0.07})_2O_4$ | $LiNi_{0.60}Mn_{0.20}Co_{0.20}O_2$ | 30/70 | 87 |
| Ex. 20 | 9 | $Li(Mn_{0.93}Li_{0.07})_2O_4$ | $LiNi_{0.50}Mn_{0.30}Co_{0.20}O_2$ | 85/15 | 83 |
| Ex. 21 | 9 | $Li(Mn_{0.93}Li_{0.07})_2O_4$ | $LiNi_{0.50}Mn_{0.30}Co_{0.20}O_2$ | 50/50 | 85 |
| Ex. 22 | 9 | $Li(Mn_{0.93}Li_{0.07})_2O_4$ | $LiNi_{0.50}Mn_{0.30}Co_{0.20}O_2$ | 30/70 | 86 |

Ex. = Example

TABLE 3

| | Compound No. | LMO | Layered Li Compound | Ratio of LMO/Li Layered Compound (weight ratio) | Residual Capacity Ratio (%) |
|---|---|---|---|---|---|
| Ex. 23 | 9 | $Li(Mn_{0.95}Li_{0.025}Mg_{0.025})_2O_4$ | $LiNi_{0.80}Co_{0.20}O_2$ | 85/15 | 82 |
| Ex. 24 | 9 | $Li(Mn_{0.95}Li_{0.025}Mg_{0.025})_2O_4$ | $LiNi_{0.80}Co_{0.20}O_2$ | 50/50 | 86 |
| Ex. 25 | 9 | $Li(Mn_{0.95}Li_{0.025}Mg_{0.025})_2O_4$ | $LiNi_{0.80}Co_{0.15}Al_{0.05}O_2$ | 85/15 | 83 |
| Ex. 26 | 9 | $Li(Mn_{0.95}Li_{0.025}Mg_{0.025})_2O_4$ | $LiNi_{0.80}Co_{0.15}Al_{0.05}O_2$ | 50/50 | 84 |
| Ex. 27 | 9 | $Li(Mn_{0.95}Li_{0.025}Mg_{0.025})_2O_4$ | $LiNi_{0.80}Mn_{0.10}Co_{0.10}O_2$ | 85/15 | 81 |
| Ex. 28 | 9 | $Li(Mn_{0.95}Li_{0.025}Mg_{0.025})_2O_4$ | $LiNi_{0.80}Mn_{0.10}Co_{0.10}O_2$ | 50/50 | 84 |
| Ex. 29 | 9 | $Li(Mn_{0.95}Li_{0.025}Mg_{0.025})_2O_4$ | $LiNi_{0.70}Mn_{0.20}Co_{0.10}O_2$ | 85/15 | 80 |
| Ex. 30 | 9 | $Li(Mn_{0.95}Li_{0.025}Mg_{0.025})_2O_4$ | $LiNi_{0.70}Mn_{0.20}Co_{0.10}O_2$ | 50/50 | 83 |
| Ex. 31 | 9 | $Li(Mn_{0.95}Li_{0.025}Mg_{0.025})_2O_4$ | $LiNi_{0.60}Mn_{0.20}Co_{0.20}O_2$ | 85/15 | 81 |
| Ex. 32 | 9 | $Li(Mn_{0.95}Li_{0.025}Mg_{0.025})_2O_4$ | $LiNi_{0.60}Mn_{0.20}Co_{0.20}O_2$ | 50/50 | 84 |
| Ex. 33 | 9 | $Li(Mn_{0.95}Li_{0.025}Mg_{0.025})_2O_4$ | $LiNi_{0.60}Mn_{0.20}Co_{0.20}O_2$ | 30/70 | 86 |
| Ex. 34 | 9 | $Li(Mn_{0.95}Li_{0.025}Mg_{0.025})_2O_4$ | $LiNi_{0.50}Mn_{0.30}Co_{0.20}O_2$ | 85/15 | 84 |
| Ex. 35 | 9 | $Li(Mn_{0.95}Li_{0.025}Mg_{0.025})_2O_4$ | $LiNi_{0.50}Mn_{0.30}Co_{0.20}O_2$ | 50/50 | 85 |
| Ex. 36 | 9 | $Li(Mn_{0.95}Li_{0.025}Mg_{0.025})_2O_4$ | $LiNi_{0.50}Mn_{0.30}Co_{0.20}O_2$ | 30/70 | 85 |
| Ex. 37 | 9 | $Li(Mn_{0.94}Li_{0.025}Al_{0.025}B_{0.01})_2O_4$ | $LiNi_{0.80}Co_{0.20}O_2$ | 85/15 | 81 |
| Ex. 38 | 9 | $Li(Mn_{0.94}Li_{0.025}Al_{0.025}B_{0.01})_2O_4$ | $LiNi_{0.80}Co_{0.20}O_2$ | 50/50 | 85 |
| Ex. 39 | 9 | $Li(Mn_{0.94}Li_{0.025}Al_{0.025}B_{0.01})_2O_4$ | $LiNi_{0.80}Co_{0.15}Al_{0.05}O_2$ | 85/15 | 82 |
| Ex. 40 | 9 | $Li(Mn_{0.94}Li_{0.025}Al_{0.025}B_{0.01})_2O_4$ | $LiNi_{0.80}Co_{0.15}Al_{0.05}O_2$ | 50/50 | 87 |
| Ex. 41 | 9 | $Li(Mn_{0.94}Li_{0.025}Al_{0.025}B_{0.01})_2O_4$ | $LiNi_{0.80}Mn_{0.10}Co_{0.10}O_2$ | 85/15 | 80 |
| Ex. 42 | 9 | $Li(Mn_{0.94}Li_{0.025}Al_{0.025}B_{0.01})_2O_4$ | $LiNi_{0.80}Mn_{0.10}Co_{0.10}O_2$ | 50/50 | 83 |
| Ex. 43 | 9 | $Li(Mn_{0.94}Li_{0.025}Al_{0.025}B_{0.01})_2O_4$ | $LiNi_{0.70}Mn_{0.20}Co_{0.10}O_2$ | 85/15 | 83 |
| Ex. 44 | 9 | $Li(Mn_{0.94}Li_{0.025}Al_{0.025}B_{0.01})_2O_4$ | $LiNi_{0.70}Mn_{0.20}Co_{0.10}O_2$ | 50/50 | 79 |
| Ex. 45 | 9 | $Li(Mn_{0.94}Li_{0.025}Al_{0.025}B_{0.01})_2O_4$ | $LiNi_{0.60}Mn_{0.20}Co_{0.20}O_2$ | 85/15 | 85 |
| Ex. 46 | 9 | $Li(Mn_{0.94}Li_{0.025}Al_{0.025}B_{0.01})_2O_4$ | $LiNi_{0.60}Mn_{0.20}Co_{0.20}O_2$ | 50/50 | 85 |
| Ex. 47 | 9 | $Li(Mn_{0.94}Li_{0.025}Al_{0.025}B_{0.01})_2O_4$ | $LiNi_{0.60}Mn_{0.20}Co_{0.20}O_2$ | 30/70 | 86 |
| Ex. 48 | 9 | $Li(Mn_{0.94}Li_{0.025}Al_{0.025}B_{0.01})_2O_4$ | $LiNi_{0.50}Mn_{0.30}Co_{0.20}O_2$ | 85/15 | 85 |
| Ex. 49 | 9 | $Li(Mn_{0.94}Li_{0.025}Al_{0.025}B_{0.01})_2O_4$ | $LiNi_{0.50}Mn_{0.30}Co_{0.20}O_2$ | 50/50 | 86 |
| Ex. 50 | 9 | $Li(Mn_{0.94}Li_{0.025}Al_{0.025}B_{0.01})_2O_4$ | $LiNi_{0.50}Mn_{0.30}Co_{0.20}O_2$ | 30/70 | 86 |

Ex. = Example

TABLE 4

| | Compound No. | LMO | Layered Li Compound | Ratio of LMO/Li Layered Compound (weight ratio) | Residual Capacity Ratio (%) |
|---|---|---|---|---|---|
| Ex. 51 | 9 | $Li(Mn_{0.94}Li_{0.02}Al_{0.02}Co_{0.02})_2O_4$ | $LiNi_{0.80}Co_{0.20}O_2$ | 85/15 | 79 |
| Ex. 52 | 9 | $Li(Mn_{0.94}Li_{0.02}Al_{0.02}Co_{0.02})_2O_4$ | $LiNi_{0.80}Co_{0.20}O_2$ | 50/50 | 83 |
| Ex. 53 | 9 | $Li(Mn_{0.94}Li_{0.02}Al_{0.02}Co_{0.02})_2O_4$ | $LiNi_{0.80}Co_{0.15}Al_{0.05}O_2$ | 85/15 | 80 |
| Ex. 54 | 9 | $Li(Mn_{0.94}Li_{0.02}Al_{0.02}Co_{0.02})_2O_4$ | $LiNi_{0.80}Co_{0.15}Al_{0.05}O_2$ | 50/50 | 83 |
| Ex. 55 | 9 | $Li(Mn_{0.94}Li_{0.02}Al_{0.02}Co_{0.02})_2O_4$ | $LiNi_{0.80}Mn_{0.10}Co_{0.10}O_2$ | 85/15 | 81 |
| Ex. 56 | 9 | $Li(Mn_{0.94}Li_{0.02}Al_{0.02}Co_{0.02})_2O_4$ | $LiNi_{0.80}Mn_{0.10}Co_{0.10}O_2$ | 50/50 | 82 |
| Ex. 57 | 9 | $Li(Mn_{0.94}Li_{0.02}Al_{0.02}Co_{0.02})_2O_4$ | $LiNi_{0.70}Mn_{0.20}Co_{0.10}O_2$ | 85/15 | 79 |

TABLE 4-continued

| | Compound No. | LMO | Layered Li Compound | Ratio of LMO/Li Layered Compound (weight ratio) | Residual Capacity Ratio (%) |
|---|---|---|---|---|---|
| Ex. 58 | 9 | $Li(Mn_{0.94}Li_{0.02}Al_{0.02}Co_{0.02})_2O_4$ | $LiNi_{0.70}Mn_{0.20}Co_{0.10}O_2$ | 50/50 | 83 |
| Ex. 59 | 9 | $Li(Mn_{0.94}Li_{0.02}Al_{0.02}Co_{0.02})_2O_4$ | $LiNi_{0.60}Mn_{0.20}Co_{0.20}O_2$ | 85/15 | 79 |
| Ex. 60 | 9 | $Li(Mn_{0.94}Li_{0.02}Al_{0.02}Co_{0.02})_2O_4$ | $LiNi_{0.60}Mn_{0.20}Co_{0.20}O_2$ | 50/50 | 83 |
| Ex. 61 | 9 | $Li(Mn_{0.94}Li_{0.02}Al_{0.02}Co_{0.02})_2O_4$ | $LiNi_{0.60}Mn_{0.20}Co_{0.20}O_2$ | 30/70 | 85 |
| Ex. 62 | 9 | $Li(Mn_{0.94}Li_{0.02}Al_{0.02}Co_{0.02})_2O_4$ | $LiNi_{0.50}Mn_{0.30}Co_{0.20}O_2$ | 85/15 | 78 |
| Ex. 63 | 9 | $Li(Mn_{0.94}Li_{0.02}Al_{0.02}Co_{0.02})_2O_4$ | $LiNi_{0.50}Mn_{0.30}Co_{0.20}O_2$ | 50/50 | 82 |
| Ex. 64 | 9 | $Li(Mn_{0.94}Li_{0.02}Al_{0.02}Co_{0.02})_2O_4$ | $LiNi_{0.50}Mn_{0.30}Co_{0.20}O_2$ | 30/70 | 85 |
| Ex. 65 | 9 | $Li(Mn_{0.95}Li_{0.01}Mg_{0.01}Al_{0.01}Co_{0.01}B_{0.01})_2O_4$ | $LiNi_{0.80}Co_{0.20}O_2$ | 85/15 | 81 |
| Ex. 66 | 9 | $Li(Mn_{0.95}Li_{0.01}Mg_{0.01}Al_{0.01}Co_{0.01}B_{0.01})_2O_4$ | $LiNi_{0.80}Co_{0.20}O_2$ | 50/50 | 85 |
| Ex. 67 | 9 | $Li(Mn_{0.95}Li_{0.01}Mg_{0.01}Al_{0.01}Co_{0.01}B_{0.01})_2O_4$ | $LiNi_{0.80}Co_{0.15}Al_{0.05}O_2$ | 85/15 | 82 |
| Ex. 68 | 9 | $Li(Mn_{0.95}Li_{0.01}Mg_{0.01}Al_{0.01}Co_{0.01}B_{0.01})_2O_4$ | $LiNi_{0.80}Co_{0.15}Al_{0.05}O_2$ | 50/50 | 86 |
| Ex. 69 | 9 | $Li(Mn_{0.95}Li_{0.01}Mg_{0.01}Al_{0.01}Co_{0.01}B_{0.01})_2O_4$ | $LiNi_{0.80}Mn_{0.10}Co_{0.10}O_2$ | 85/15 | 80 |
| Ex. 70 | 9 | $Li(Mn_{0.95}Li_{0.01}Mg_{0.01}Al_{0.01}Co_{0.01}B_{0.01})_2O_4$ | $LiNi_{0.80}Mn_{0.10}Co_{0.10}O_2$ | 50/50 | 84 |
| Ex. 71 | 9 | $Li(Mn_{0.95}Li_{0.01}Mg_{0.01}Al_{0.01}Co_{0.01}B_{0.01})_2O_4$ | $LiNi_{0.70}Mn_{0.20}Co_{0.10}O_2$ | 85/15 | 79 |
| Ex. 72 | 9 | $Li(Mn_{0.95}Li_{0.01}Mg_{0.01}Al_{0.01}Co_{0.01}B_{0.01})_2O_4$ | $LiNi_{0.70}Mn_{0.20}Co_{0.10}O_2$ | 50/50 | 83 |
| Ex. 73 | 9 | $Li(Mn_{0.95}Li_{0.01}Mg_{0.01}Al_{0.01}Co_{0.01}B_{0.01})_2O_4$ | $LiNi_{0.60}Mn_{0.20}Co_{0.20}O_2$ | 85/15 | 79 |
| Ex. 74 | 9 | $Li(Mn_{0.95}Li_{0.01}Mg_{0.01}Al_{0.01}Co_{0.01}B_{0.01})_2O_4$ | $LiNi_{0.60}Mn_{0.20}Co_{0.20}O_2$ | 50/50 | 84 |
| Ex. 75 | 9 | $Li(Mn_{0.95}Li_{0.01}Mg_{0.01}Al_{0.01}Co_{0.01}B_{0.01})_2O_4$ | $LiNi_{0.60}Mn_{0.20}Co_{0.20}O_2$ | 30/70 | 85 |
| Ex. 76 | 9 | $Li(Mn_{0.95}Li_{0.01}Mg_{0.01}Al_{0.01}Co_{0.01}B_{0.01})_2O_4$ | $LiNi_{0.50}Mn_{0.30}Co_{0.20}O_2$ | 85/15 | 79 |
| Ex. 77 | 9 | $Li(Mn_{0.95}Li_{0.01}Mg_{0.01}Al_{0.01}Co_{0.01}B_{0.01})_2O_4$ | $LiNi_{0.50}Mn_{0.30}Co_{0.20}O_2$ | 50/50 | 83 |
| Ex. 78 | 9 | $Li(Mn_{0.95}Li_{0.01}Mg_{0.01}Al_{0.01}Co_{0.01}B_{0.01})_2O_4$ | $LiNi_{0.50}Mn_{0.30}Co_{0.20}O_2$ | 30/70 | 85 |

Ex. = Example

TABLE 5

| | Compound No. | LMO | Layered Li Compound | Ratio of LMO/Li Layered Compound (weight ratio) | Residual Capacity Ratio (%) |
|---|---|---|---|---|---|
| Ex. 79 | 9 | $Li(Mn_{0.98}Li_{0.02})_2O_4$ | $LiNi_{0.50}Mn_{0.30}Co_{0.20}O_2$ | 50/50 | 79 |
| Ex. 80 | 9 | $Li(Mn_{0.95}Mg_{0.05})_2O_4$ | $LiNi_{0.50}Mn_{0.30}Co_{0.20}O_2$ | 50/50 | 78 |
| Ex. 81 | 9 | $Li(Mn_{0.95}Al_{0.05})_2O_4$ | $LiNi_{0.50}Mn_{0.30}Co_{0.20}O_2$ | 50/50 | 77 |
| Ex. 82 | 9 | $Li(Mn_{0.95}Al_{0.025}Co_{0.025})_2O_4$ | $LiNi_{0.50}Mn_{0.30}Co_{0.20}O_2$ | 50/50 | 78 |
| Ex. 83 | 9 | $Li(Mn_{0.98}Li_{0.01}Mg_{0.01})_2O_4$ | $LiNi_{0.50}Mn_{0.30}Co_{0.20}O_2$ | 50/50 | 79 |
| Ex. 84 | 9 | $Li(Mn_{0.94}Li_{0.025}Mg_{0.025}B_{0.01})_2O_4$ | $LiNi_{0.50}Mn_{0.30}Co_{0.20}O_2$ | 50/50 | 80 |
| Ex. 85 | 9 | $Li(Mn_{0.98}Li_{0.01}Al_{0.01})_2O_4$ | $LiNi_{0.50}Mn_{0.30}Co_{0.20}O_2$ | 50/50 | 77 |
| Ex. 86 | 9 | $Li(Mn_{0.95}Li_{0.025}Al_{0.025})_2O_4$ | $LiNi_{0.50}Mn_{0.30}Co_{0.20}O_2$ | 50/50 | 79 |
| Ex. 87 | 9 | $Li(Mn_{0.97}Li_{0.02}Al_{0.01}Co_{0.01})_2O_4$ | $LiNi_{0.50}Mn_{0.30}Co_{0.20}O_2$ | 50/50 | 78 |
| Ex. 88 | 9 | $Li(Mn_{0.93}Li_{0.02}Al_{0.02}Co_{0.02}B_{0.01})_2O_4$ | $LiNi_{0.50}Mn_{0.30}Co_{0.20}O_2$ | 50/50 | 79 |
| Ex. 89 | 9 | $Li(Mn_{0.95}Li_{0.01}Mg_{0.01}Al_{0.01}Co_{0.01}B_{0.01})_2O_4$ | $LiNi_{0.40}Mn_{0.30}Co_{0.30}O_2$ | 50/50 | 80 |
| Ex. 90 | 9 | $Li(Mn_{0.95}Li_{0.01}Mg_{0.01}Al_{0.01}Co_{0.01}B_{0.01})_2O_4$ | $LiNi_{0.33}Mn_{0.33}Co_{0.33}O_2$ | 50/50 | 81 |
| Ex. 91 | 9 | $Li(Mn_{0.95}Li_{0.01}Mg_{0.01}Al_{0.01}Co_{0.01}B_{0.01})_2O_4$ | $LiNi_{0.30}Mn_{0.30}Co_{0.30}Mg_{0.10}O_2$ | 50/50 | 80 |
| Ex. 92 | 9 | $Li(Mn_{0.95}Li_{0.01}Mg_{0.01}Al_{0.01}Co_{0.01}B_{0.01})_2O_4$ | $LiNi_{0.30}Mn_{0.30}Co_{0.30}Zr_{0.10}O_2$ | 50/50 | 79 |

It was verified that the batteries shown in Examples 1 to 92, as compared with Comparative Example 1, were improved in the residual capacity ratios, i.e., improved in the storage characteristics.

INDUSTRIAL APPLICABILITY

Examples of the application of the present invention include driving devices such as electric vehicles, hybrid electric vehicles, electric motorcycles and electric power-assisted bicycles; tools such as electric tools; electronic devices such as portable terminals and notebook personal computers; and storage batteries for household electricity storage systems and solar power generation systems.

EXPLANATION OF SYMBOLS

1: positive electrode active material layer
2: negative electrode active material layer
3: positive electrode current collector
4: negative electrode current collector
5: porous separator
6: laminate outer package
7: laminate outer package
8: negative electrode tab
9: positive electrode tab

The invention claimed is:

1. A nonaqueous electrolyte solution secondary battery, comprising:
an electrode element having a positive electrode and a negative electrode disposed so as to face each other; a nonaqueous electrolyte solution; and an outer package housing the electrode element and the nonaqueous electrolyte solution,
wherein the nonaqueous electrolyte solution comprises a cyclic sulfonic acid ester represented by the general formula (1); and
a positive electrode active material in the positive electrode is a mixture of a lithium manganese composite oxide having a spinel structure represented by $Li(Mn_{0.95}Li_{0.01}Mg_{0.01}Al_{0.01}Co_{0.01}B_{0.01})_2O_4$ and a lithium transition metal composite compound having a layered rock salt structure:

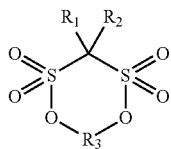

(1)

wherein, in the formula (1), $R_1$ is a hydrogen atom, and $R_2$ is a methyl group and $R_3$ is $CH_2$.

2. The nonaqueous electrolyte solution secondary battery according to claim 1, wherein the positive electrode active material has a mixing ratio in weight ratio of (the lithium manganese composite oxide)/(the lithium manganese composite oxide+the lithium transition metal composite compound) of 0.15 to 0.85 by weight.

3. The nonaqueous electrolyte solution secondary battery according to claim 1, wherein the lithium transition metal composite compound having a layered rock salt structure is represented by the general formula (3):

$$Li_\beta MeO_2 \quad (3)$$

wherein, in the formula (3), Me necessarily comprises Ni, and comprises one or two or more elements selected from the group consisting of Co, Al, Mn, Mg and Zr; and $\beta$ is $0.98 \le \beta \le 1.02$.

4. A method for producing a nonaqueous electrolyte solution secondary battery comprising an electrode element, a nonaqueous electrolyte solution and an outer package, the method comprising:

a step of disposing a positive electrode comprising a positive electrode active material and a negative electrode so as to face each other to thereby fabricate the electrode element; and a step of sealing the electrode element and the nonaqueous electrolyte solution in the outer package, wherein the nonaqueous electrolyte solution comprises a cyclic sulfonic acid ester represented by the formula (1); and the positive electrode active material comprises a lithium manganese composite oxide having a spinel structure represented by $Li(Mn_{0.95}Li_{0.01}Mg_{0.01}Al_{0.01}Co_{0.01}B_{0.01})_2O_4$, and a lithium transition metal composite compound having a layered rock salt structure:

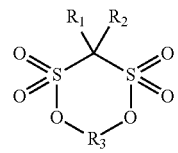

(1)

wherein, in the formula (1), $R_1$ is a hydrogen atom, $R_2$ is a methyl group, and $R_3$ is $CH_2$.

* * * * *